US012597194B2

(12) United States Patent
Chand et al.

(10) Patent No.: US 12,597,194 B2
(45) Date of Patent: Apr. 7, 2026

(54) METHOD FOR OBTAINING IMAGE RELATED TO VIRTUAL REALITY CONTENT AND ELECTRONIC DEVICE SUPPORTING THE SAME

(71) Applicant: Samsung Electronics Co., Ltd., Suwon-si (KR)

(72) Inventors: Atulesh Chand, Suwon-si (KR); Killyeon Kim, Suwon-si (KR); Wonshik Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 229 days.

(21) Appl. No.: 18/501,350

(22) Filed: Nov. 3, 2023

(65) Prior Publication Data

US 2024/0153192 A1    May 9, 2024

Related U.S. Application Data

(63) Continuation of application No. PCT/KR2023/017521, filed on Nov. 3, 2023.

(30) Foreign Application Priority Data

Nov. 4, 2022    (KR) ......................... 10-2022-0146282
Nov. 11, 2022   (KR) ......................... 10-2022-0150625

(51) Int. Cl.
*G06T 15/00*        (2011.01)
*H04N 23/69*        (2023.01)

(52) U.S. Cl.
CPC ............. *G06T 15/00* (2013.01); *H04N 23/69* (2023.01)

(58) Field of Classification Search
CPC ......... G06T 19/006; G06T 15/00; G06T 7/70; G06F 2203/0383; G06F 3/1423;

(Continued)

(56) References Cited

U.S. PATENT DOCUMENTS

2011/0113382 A1    5/2011   Cannon et al.
2015/0062113 A1    3/2015   Cannon et al.
(Continued)

FOREIGN PATENT DOCUMENTS

JP       2020-150297       9/2020
KR    10-2016-0003522      1/2016
(Continued)

OTHER PUBLICATIONS

Search Report and Written Opinion dated Feb. 7, 2024 issued in International Patent Application No. PCT/KR2023/017521.

*Primary Examiner* — Hau H Nguyen
(74) *Attorney, Agent, or Firm* — Nixon & Vanderhye P.C.

(57)    ABSTRACT

According to an embodiment, there may be provided an electronic device comprising a communication module comprising communication circuitry; a camera module comprising at least one camera; a display module comprising a display; and at least one processor operatively connected to the communication module, the camera module, and the display module, wherein one or more of the at least one processor is configured to: execute a camera application, establish a communication connection with a first external electronic device corresponding to first identification information through the communication module based on obtaining first identification information while the camera application is executed, display a first space on the execution screen of the camera application through the display module based on data received from the first external electronic device based on the communication connection, transmit a request for changing a composition of the first space to the first external electronic device based on identifying a first event associated with the camera application, display the composition-changed first space on the execution screen of the camera application through the display module based on receiving data generated based on the request, from the first (Continued)

external electronic device, and obtain an image of the composition-changed first space based on an input.

20 Claims, 22 Drawing Sheets

(58) Field of Classification Search
CPC .... G06F 3/1454; H04N 23/69; H04N 23/632;
H04N 23/66; H04N 23/60
See application file for complete search history.

(56) References Cited

U.S. PATENT DOCUMENTS

| | | | |
|---|---|---|---|
| 2020/0304631 A1* | 9/2020 | Kim | .................... H04M 1/2757 |
| 2020/0380901 A1* | 12/2020 | Ryu | ......................... G09G 3/20 |
| 2021/0051276 A1 | 2/2021 | Park et al. | |
| 2021/0407211 A1 | 12/2021 | Yi et al. | |
| 2022/0167142 A1 | 5/2022 | Myong et al. | |
| 2022/0224828 A1* | 7/2022 | Lim | ....................... H04N 23/63 |
| 2022/0232172 A1 | 7/2022 | Wang | |
| 2022/0264670 A1 | 8/2022 | Yoo et al. | |

FOREIGN PATENT DOCUMENTS

| | | |
|---|---|---|
| KR | 10-2019-0061330 | 6/2019 |
| KR | 10-2019-0129592 | 11/2019 |
| KR | 10-2020-0109812 | 9/2020 |
| KR | 10-2020-0121055 | 10/2020 |
| KR | 102167010 B1 | 10/2020 |
| KR | 10-2021-0057392 | 5/2021 |
| KR | 10-2022-0086078 | 6/2022 |
| KR | 20220105354 A | 7/2022 |
| KR | 10-2022-0140391 | 10/2022 |

* cited by examiner

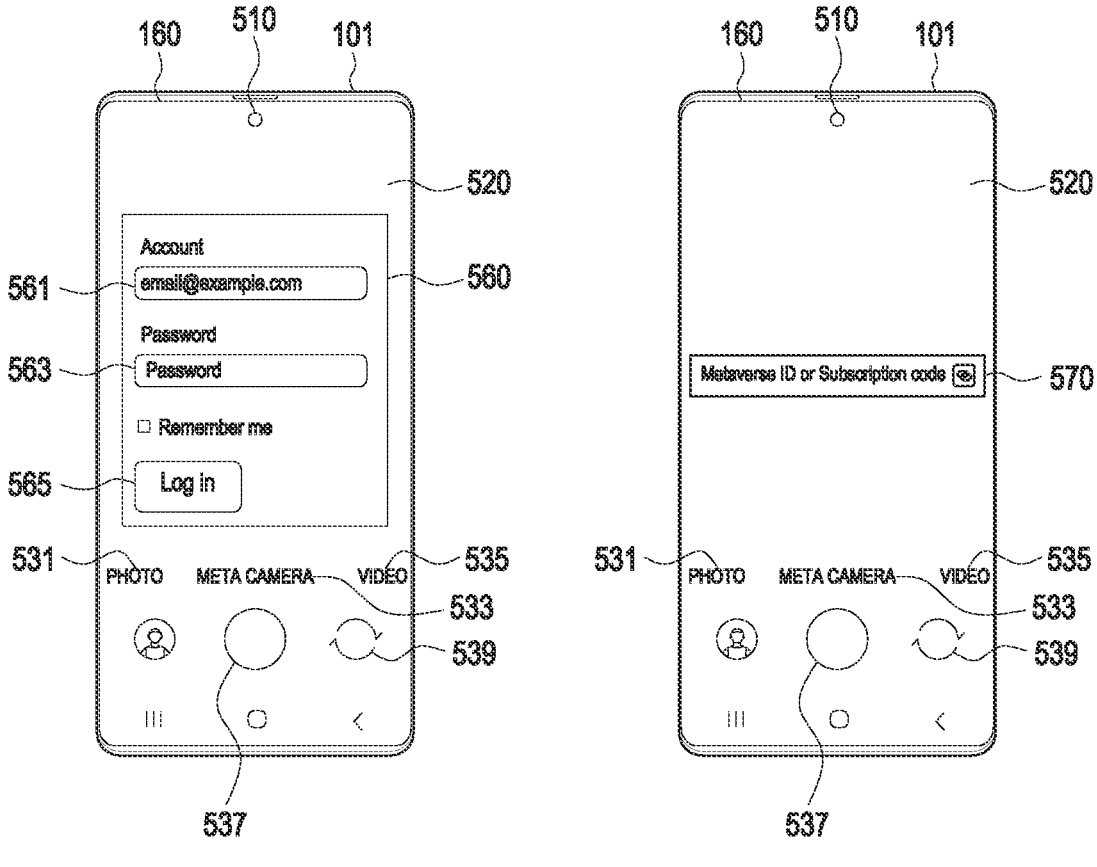
FIG. 5C                    FIG. 5D

START

DISPLAY THIRD WINDOW ASSOCIATED
WITH ACCOUNT SETTING — 601

DISPLAY FOURTH WINDOW ASSOCIATED WITH
INPUT OF IDENTIFICATION INFORMATION — 603

DISPLAY ACCOUNT INFORMATION CORRESPONDING
TO SECOND IDENTIFICATION INFORMATION — 605

END

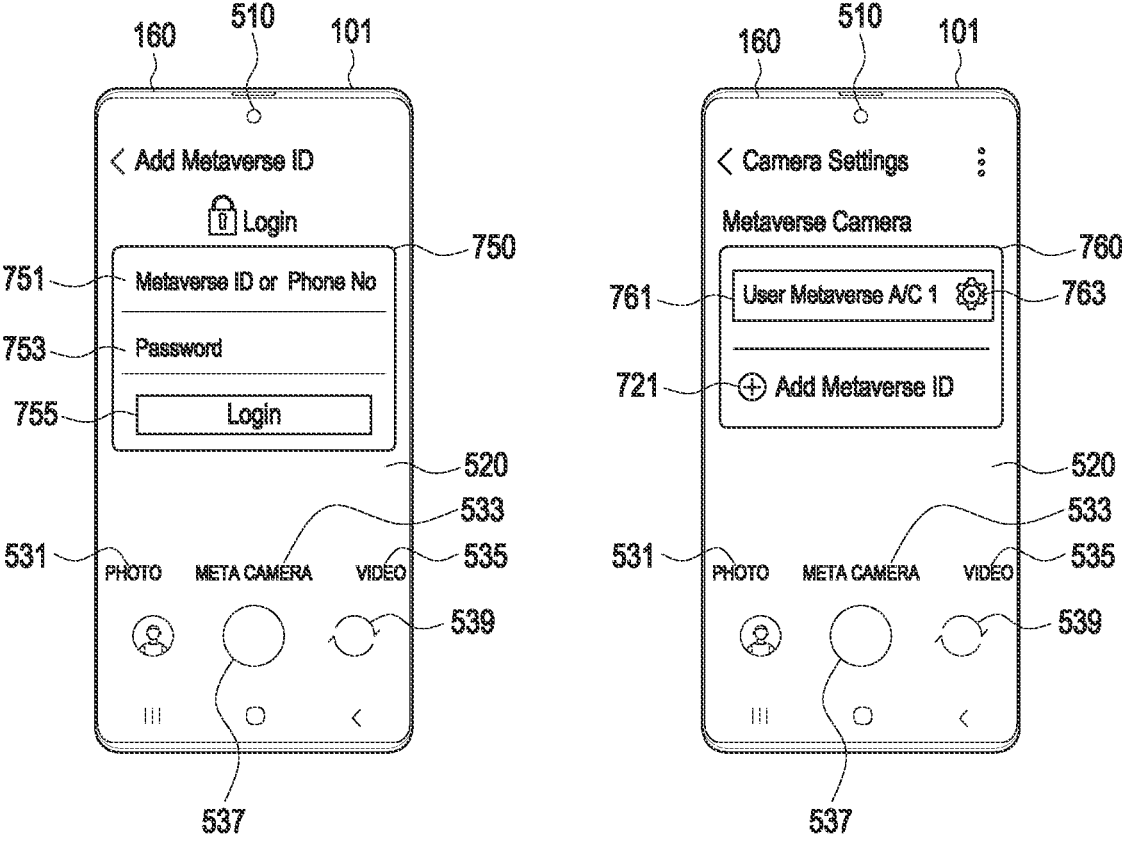
FIG. 7E                    FIG. 7F

METHOD FOR OBTAINING IMAGE RELATED TO VIRTUAL REALITY CONTENT AND ELECTRONIC DEVICE SUPPORTING THE SAME

CROSS-REFERENCE TO RELATED APPLICATIONS

This application is a continuation of International Application No. PCT/KR2023/017521 designating the United States, filed on Nov. 3, 2023, in the Korean Intellectual Property Receiving Office and claiming priority to Korean Patent Application Nos. 10-2022-0146282, filed on Nov. 4, 2022, in the Korean Intellectual Property Office and 10-2022-0150625, filed on Nov. 11, 2022, in the Korean Intellectual Property Office, the disclosures of each of which are incorporated by reference herein in their entireties.

BACKGROUND

Field

The disclosure relates to a method for obtaining an image related to virtual reality content and an electronic device supporting the same.

Description of Related Art

Metaverse-related content is being actively provided. For example, virtual space-based metaverse-related content that performs a designated activity in a virtual space through an avatar may be provided. For example, there may be provided augmented reality-based metaverse-related content that allows additional information to be viewed as superposed on the actual environment or allows other objects to be viewed as superposed on the actual environment. As the metaverse-related content is advanced, a large number of users may access the metaverse service.

Multiple users may access a metaverse server by means of their respective devices. Each device may access the metaverse server based on cellular data communication or IEEE 802.11 communication corresponding thereto. Cellular data communications corresponding to the respective devices may be operated by the same network operator or different network operators. When operated by different network operators, the cellular data communications may have different communication environments. Or, the environment related to connection of each cellular data communication to the metaverse server, e.g., whether the network slice for the application corresponding to the metaverse service is supported or whether edge computing for the metaverse server is supported may differ. Accordingly, when various devices access a metaverse server, the devices may have different capabilities of transmission/reception with the metaverse server.

SUMMARY

According to an example embodiment of the disclosure, an electronic device may comprise: a communication module comprising communication circuitry, a camera module comprising a camera, a display, and at least one processor operatively connected to the communication module, the camera module, and the display module. One or more of the at least one processor may be configured to execute a camera application. One or more of the at least one processor may be configured to establish a communication connection with a first external electronic device corresponding to first identification information through the communication module based on obtaining first identification information while the camera application is executed. One or more of the at least one processor may be configured control the display to display a first space on the execution screen of the camera application based on data received from the first external electronic device based on the communication connection. One or more of the at least one processor may be configured to control the communication module to transmit a request for changing a composition of the first space to the first external electronic device based on identifying a first event associated with the camera application. One or more of the at least one processor may be configured to control the display to display the composition-changed first space on the execution screen of the camera based on receiving data generated based on the request, from the first external electronic device. One or more of the at least one processor may be configured to obtain an image of the composition-changed first space based on an input.

According to an example embodiment of the disclosure, a method for obtaining an image related to virtual reality content by an electronic device may comprise executing a camera application. The method may comprise establishing a communication connection with a first external electronic device corresponding to first identification information through a communication module comprising communication circuitry of the electronic device based on obtaining first identification information while the camera application is executed. The method may comprise displaying a first space on the execution screen of the camera application through a display of the electronic device, based on data received from the first external electronic device. The method may comprise transmitting a request for changing a composition of the first space to the first external electronic device based on identifying first event associated with the camera application. The method may comprise displaying the composition-changed first space on the execution screen of the camera application through the display based on receiving data generated based on the request, from the first external electronic device. The method may comprise obtaining an image of the composition-changed first space based on an input.

According to an example embodiment of the disclosure, in a non-transitory computer-readable storage medium storing instructions, the instructions may, when executed by at least one circuit of an electronic device, cause the electronic device to perform at least one operation. The at least one operation may include executing a camera application. The at least one operation may include establishing a communication connection with a first external electronic device corresponding to first identification information through a communication module of the electronic device based on obtaining first identification information while the camera application is executed. The at least one operation may include displaying a first space on the execution screen of the camera application through a display of the electronic device, based on data received from the first external electronic device. The at least one operation may include transmitting a request for changing a composition of the first space to the first external electronic device based on identifying first event associated with the camera application. The at least one operation may include displaying the composition-changed first space on the execution screen of the camera application through the display based on receiving data generated based on the request, from the first external electronic device. The at least one operation may include obtaining an image of the composition-changed first space based on an input.

Embodiments of the disclosure are not limited to the foregoing objectives, and other objectives would readily be appreciated by a skilled artisan from the following detailed description taken in conjunction with the accompanying drawings.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIGS. 5A, 5B, 5C, 5D, 5E, and 5F are diagrams illustrating an example of establishing communication with an external electronic device by an electronic device according to various embodiments;

FIGS. 7A, 7B, 7C, 7D, 7E, and 7F are diagrams illustrating an example of storing account information based on a user identifier by an electronic device according to various embodiments;

DETAILED DESCRIPTION

Figure 1:
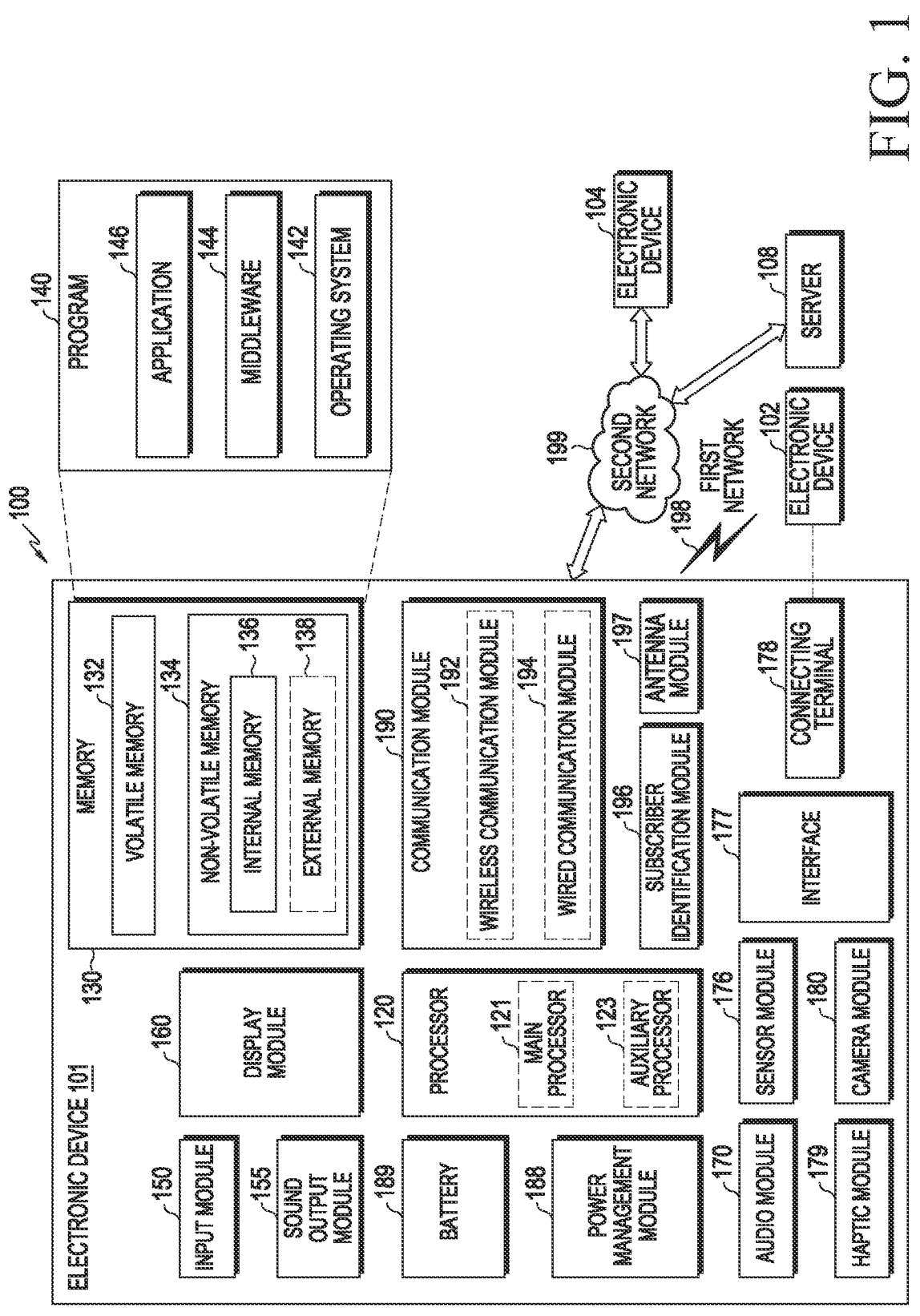
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with at least one of an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment, at least one (e.g., the connecting terminal 178) of the components may be omitted from the electronic device 101, or one or more other components may be added in the electronic device 101. According to an embodiment, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor configured to detect a touch, or a pressure sensor configured to measure the intensity of a force generated by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

According to an embodiment, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
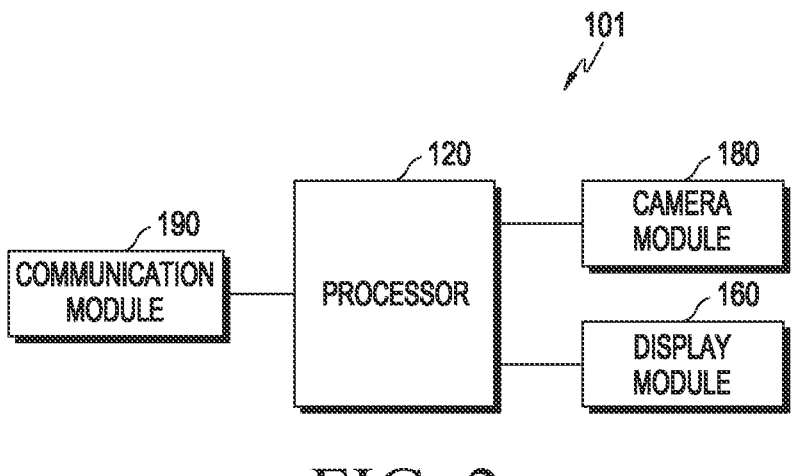
FIG. 2 is a block diagram illustrating an example configuration of an electronic device according to various embodiments.

FIG. 2 is a block diagram illustrating an example configuration of an electronic device 101 (e.g., the electronic device 101 of FIG. 1) according to various embodiments.

Referring to FIG. 2, in an embodiment, the electronic device 101 may include a communication module (e.g., including communication circuitry) 190, a camera module (e.g., including a camera) 180, a display module (e.g., including a display) 160, and at least one processor (e.g., including processing circuitry) 120 operatively connected with the communication module 190, the camera module 180, and the display module 160.

In an embodiment, the communication module 190 may be included in the communication module 190 of FIG. 1. In an embodiment, the communication module 190 may include various communication circuitry and communicate with an external electronic device (e.g., the server 108 of FIG. 1) through a second network (e.g., the second network 199 of FIG. 1). In an embodiment, the electronic device 101 (e.g., the communication module 190) may transmit data to an external electronic device and/or may receive data from the external electronic device. In an embodiment, the external electronic device may be implemented as a server that stores and/or processes virtual reality content. The electronic device 101 may communicate with at least one external electronic device through the second network 199.

In an embodiment, the camera module 180 may be included in the camera module 180 of FIG. 1. In an embodiment, the camera module 180 may include at least one camera, including, for example, a front camera disposed toward the user's face from the electronic device 101 and a rear camera disposed in a direction in which the user faces the subject.

In an embodiment, the display module 160 may include the display module 160 of FIG. 1. In an embodiment, the display module 160 may include a display and display an image obtained by the camera module 180. For example, the display module 160 may display an image obtained by the front camera. In an embodiment, the display module 160 may display virtual reality content obtained (or received) from the external electronic device through the second network 199. The display module 220 may display a dynamic image (e.g., a preview image or a video) and/or a still image obtained from the camera module 180 and/or the external electronic device.

According to an embodiment, the processor 120 may be included in the processor 120 of FIG. 1. In an embodiment, the processor 120 may include various processing circuitry (as used herein, including the claims, the term "processor" may include various processing circuitry, including at least one processor, wherein one or more processors of at least one processor may be configured to perform the various functions described herein) and control an overall operation for obtaining an image including virtual reality content. In an embodiment, the processor 120 may include one or more processors for obtaining an image including virtual reality content. The one or more processors may be operatively connected to the communication module 190, the camera module 180, and the display module 160. An embodiment performed by the processor 120 to obtain an image including virtual reality content is described below with reference to FIGS. 3 to 13.

Although FIG. 2 illustrates that the electronic device 101 includes the communication module 190, the camera module 180, the display module 160, and/or the processor 120, the disclosure is not limited thereto. For example, the electronic device 101 may further include at least one component shown in FIG. 2. For example, the electronic device 101 may further include a sensor module (e.g., the sensor module 176 of FIG. 1) for detecting a movement of the electronic device 101.

Figure 3:
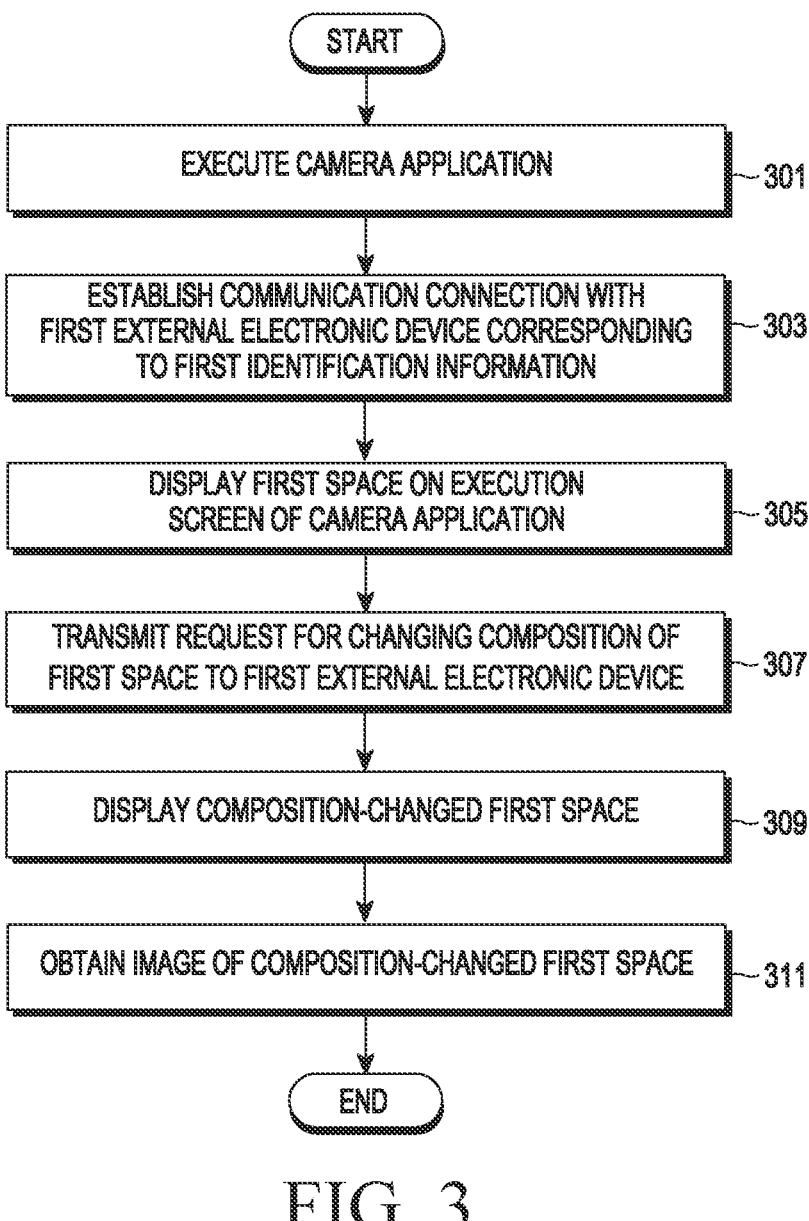
FIG. 3 is a flowchart illustrating an example operation of obtaining an image related to virtual reality content by an electronic device according to various embodiments.

FIG. 3 is a flowchart illustrating an example operation of obtaining an image related to virtual reality content by an electronic device (e.g., the electronic device 101 of FIG. 2) according to various embodiments.

Referring to FIG. 3, in operation 301, in an embodiment, the electronic device 101 (e.g., the processor 120 of FIG. 2) may execute a camera application.

In an embodiment, the electronic device 101 may execute a camera application based on identifying an input, e.g., a user input. An event that triggers the electronic device 101 to execute the camera application is not limited to the example described above. The electronic device 101 may display an image obtained by the camera module (e.g., the camera module 180 of FIG. 1) through the display module (e.g., the display module 160 of FIG. 1) by executing the camera application. For example, the electronic device 101 may display an image obtained by the front camera or the rear camera on the execution screen of the camera application. In an embodiment, the image obtained by the camera module 180 may include a preview image. In an embodiment, the electronic device 101 may display an object for establishing communication connection with an external electronic device on the execution screen of the camera application. The electronic device 101 may display an window (e.g., an account selection window) associated with account selection for selecting any one account from among one or more accounts on the execution screen of the camera application, based on a user input to the object. In an embodiment, the window associated with account selection may include an object for at least one account corresponding to at least one external electronic device (e.g., the server 108 of FIG. 1). In an embodiment, the object for the account may include an identification information (e.g., an ID, a nickname, or a name of an external electronic device) for the at least one account. In an embodiment, the user input to the object may include an event of touching the display module 160, but is not limited thereto. In an embodiment, one or more accounts may be associated with one or more external electronic devices. In an embodiment, each of the one or more accounts may be associated with at least one external electronic device, respectively. In an embodiment, one or more accounts may be associated with the same external electronic device. For example, the electronic device 101 may establish communication connection with the external electronic device corresponding to the selected account, based on the user input associated with selection of any one account from among one or more accounts. In an embodiment, the electronic device 101 may identify a selected external electronic device from among one or more external electronic devices, based on the user input to the window associated with account selection. The electronic device 101 may establish communication connection with the selected external electronic device by executing the camera application without installing one or more applications for accessing each of the one or more external electronic devices.

In operation 303, in an embodiment, the electronic device 101 may establish communication connection with a first external electronic device corresponding to a first identification information.

In an embodiment, the electronic device 101 may display a window associated with input of identification information (e.g., identification information input window) through the display module 160, based on a user input to any one of the one or more objects displayed on the window associated with account selection, while the camera application is executed. In an embodiment, the electronic device 101 may identify the user identification information (e.g., identification information corresponding to a user of the electronic device 101), based on a user input to the window associated with input of the identification information. In an embodiment, the user input to the window associated with input of identification information may include an event of inputting a user ID and a password, or an event of inputting a subscription code, but is not limited thereto. In an embodiment, the subscription code may include a combination of at least one of text or numbers. In an embodiment, the electronic device 101 may establish communication connection with the external electronic device corresponding to the identification information from among at least one external electronic device, based on identifying the identification information corresponding to the user of the electronic device 101. In an embodiment, the electronic device 101 may identify whether the user of the electronic device 101 has the right to use the function of accessing the external electronic device corresponding to the identification information, based on the identification information. In an embodiment, the electronic device 101 may transmit a request for allowing the external electronic device corresponding to the selected account to verify the user's right to use to the external electronic device corresponding to the identification information. In an embodiment, the request may include encrypted information corresponding to the identification information. The external electronic device corresponding to the identification information may verify the identification information based on the request transmitted by the electronic device 101. The external electronic device may transmit a response to the request to the electronic device 101 based on identifying that the user identifier is valid. The electronic device 101 may establish communication connection with the external electronic device corresponding to the identification information by receiving the response to the request from the external electronic device.

In an embodiment, the subscription code may include an identifier based on image recognition such as a quick response code (QR), but is not limited thereto. In an embodiment, when the electronic device 101 establishes communication connection with the external electronic device based on the QR code, the electronic device 101 may establish communication with the external electronic device corresponding to the QR code without displaying the window associated with account selection based on the QR code obtained by the camera module 180 while displaying the preview image through the display module 160 in operation 301. For example, the QR code may include address information corresponding to the external electronic device. In an embodiment, the address information may include a uniform resource identifier (URI) or an Internet protocol (IP) address. The electronic device 101 may establish communication connection with the external electronic device corresponding to the QR code by accessing the address of the external electronic device based on the address information corresponding to the external electronic device.

In operation 305, in an embodiment, the electronic device 101 may display a first space on the execution screen of the camera application.

In an embodiment, the electronic device 101 may receive data including virtual reality content from the external electronic device based on the communication connection. In an embodiment, the first space may include at least a portion of a virtual reality space including one or more virtual reality contents. The external electronic device may generate an avatar corresponding to the electronic device 101 in the virtual reality space based on communication establishment with the electronic device 101. In an embodiment, the avatar corresponding to the electronic device 101 may have a field of view (FOV) of a predetermined range. In an embodiment, the screen in the FOV of the avatar may include a screen looking at the virtual reality space from the inside of the avatar or a screen looking at the virtual reality space including the avatar from the outside of the avatar. The first space may include a screen within the FOV of the avatar. The electronic device 101 may transmit data obtained by the sensor module 176 to the external electronic device to control the direction and/or angle of the screen within the FOV of the avatar based on the movement detected by the sensor module (e.g., the sensor module 176 of FIG. 1). The electronic device 101 may obtain (or receive) data including at least one virtual reality content in the FOV of the avatar from the external electronic device. The electronic device 101 may display the first space on the execution screen of the camera application, through the display module, based on the data received from the external electronic device. In an embodiment, the first space may include at least portion of a virtual space recently visited by the avatar corresponding to the account of the user while the communication connection with the external electronic device is established based on the identification information of the user. In an embodiment, the first space may include a virtual space predetermined by the external electronic device when communication connection with the external electronic device is first established.

In operation 307, in an embodiment, the electronic device 101 may transmit a request for changing the composition of the first space to the first external electronic device.

In an embodiment, the electronic device 101 may transmit a request for changing the composition of the first space to the first external electronic device based on identifying a first event associated with the camera application. The electronic device 101 may change the settings of the camera application based on a user input, while the execution screen of the camera application is displayed through the display module. In an embodiment, the user input may include, but is not limited to, a touch, a swipe, a pinch, or a spread event on the display module 160. In an embodiment, an event associated with the camera application may include at least one of an event that causes the electronic device 101 to change the settings of the camera application to a rear camera mode, an event that causes the electronic device 101 to change the settings of the camera application to a selfie mode, a zoom-in event, or a zoom-out event. In an embodiment, the event associated with the camera application may include an event associated with movement of the electronic device 101. The electronic device 101 may transmit a request for changing the composition of the first space to the external electronic device based on the communication connection, based on identifying the first event associated with the camera application. In an embodiment, the composition of the first space may include at least one of the direction, angle, or magnification of the screen within the FOV of the avatar.

In operation 309, in an embodiment, the electronic device 101 may display a composition-changed first space.

In an embodiment, the electronic device 101 may display the composition-changed first space through the display module 160, based on reception of the data generated based on the request from the external electronic device. In an embodiment, the electronic device 101 may display, through the display module 160, the composition-changed first space in response to the changed settings of the camera application.

In operation 311, in an embodiment, the electronic device 101 may obtain (or receive) an image of the composition-changed first space.

In an embodiment, the electronic device 101 may obtain an image of the composition-changed first space, based on a user input. In an embodiment, the user input may include a touch event for an object with image photograph (e.g., image photograph object), but is not limited thereto. In the still image mode, the electronic device 101 may obtain a still image of the composition-changed first space, based on a user input. In an embodiment, the electronic device 101 may store the still image of the first space. The electronic device 101 may store address information about the external electronic device in metadata of the still image of the first space. For example, the electronic device 101 may store metadata including address information about the external electronic device within an image attribute of the obtained still image, and a method of storing the metadata is not limited to the above-described example. In an embodiment, the address information may include, but is not limited to, a URI or an IP address. The electronic device 101 may store address information about the first space in metadata of the still image of the first space. In an embodiment, the address information about the first space may include a URI or IP address of the first space. In an embodiment, the format of the metadata may be an exchangeable image file format (EXIF), but is not limited thereto. The electronic device 101 may obtain a video of the first space by recording the first space based on one or more sequential user inputs in the video mode. In an embodiment, the electronic device 101 may store the video of the first space. The electronic device 101 may store address information about the external electronic device in metadata of the video of the first space. The electronic device 101 may store address information about the first space in metadata of the video of the first space. In an embodiment, after establishing communication connection with the external electronic device managing the first space, the electronic device 101 may directly access the first space, based on address information about the first space stored in metadata of the still image or the video. For example, the electronic device 101 may obtain data associated with the first space from the external electronic device, based on address information about the first space, and may display the first space through the display module 160. In an embodiment, the electronic device 101 may directly access the first space, based on the address information about the first space stored in the metadata of the still image or the video, without establishing communication connection with the external electronic device managing the first space.

Figure 4:
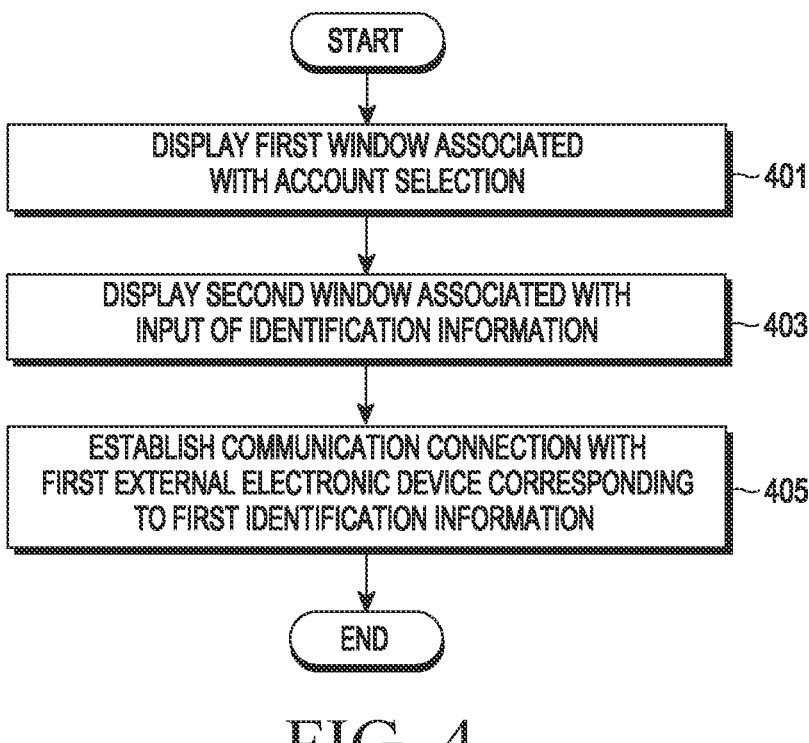
FIG. 4 is a flowchart illustrating an example operation of establishing communication with an external electronic device based on a user identifier by an electronic device according to various embodiments.

FIG. 4 is a flowchart illustrating an example operation of establishing communication connection with an external electronic device based on identification information by an electronic device according to various embodiments.

Referring to FIG. 4, in operation 401, in an embodiment, the electronic device 101 (e.g., the processor 120 of FIG. 1 or FIG. 2) may display a first window associated with account selection.

In an embodiment, the electronic device 101 may display a window associated with account selection (e.g., account selection window) for selecting any one account from among one or more accounts on the execution screen of the camera application, based on a user input to the object displayed through the display module 160. In an embodiment, the object may include an object for establishing communication connection with an external electronic device. In an embodiment, the window associated with account selection may include at least one object for at least one account associated with establishment of communication connection with at least one external electronic device (e.g., the server 108 of FIG. 1). In an embodiment, the user input to the at least one object may include an event of touching the display module 160, but is not limited thereto. In an embodiment, each of the one or more accounts may respectively correspond to one of one or more external electronic devices. For example, the electronic device 101 may establish communication connection with the external electronic device corresponding to the selected account, based on identifying a user input associated with selection of any one account from among one or more accounts. In an embodiment, the electronic device 101 may identify the selected external electronic device from among one or more external electronic devices, based on the user input to the window associated with account selection. The electronic device 101 may establish communication connection with the selected external electronic device by executing the camera application without installing one or more applications for accessing each of the one or more external electronic devices.

In operation 403, in an embodiment, the electronic device 101 may display a second window associated with input of identification information.

In an embodiment, the electronic device 101 may display a window associated with input of the identification information through the display module 160, based on a user input to any one of the at least one object displayed on the window associated with account selection. In an embodiment, the electronic device 101 may identify the identification information for connecting with an external electronic device, based on a user input to the window associated with input of identification information.

In operation 405, in an embodiment, the electronic device 101 may establish communication connection with the first external electronic device corresponding to the first identification information.

In an embodiment, the electronic device 101 may establish a communication connection with the first external electronic device corresponding to the first identification information based on obtaining the first identification information based on the user input to the second window. The electronic device 101 may identify the identification information associated with establishment of communication connection with an external electronic device, based on a user input to the window associated with input of identification information. In an embodiment, the user input to the window associated with input of identification information may include an event of inputting a user ID and a password, or an event of inputting a subscription code, but is not limited thereto. In an embodiment, the subscription code may include a combination of at least one of text or numbers. In an embodiment, the electronic device 101 may establish communication connection with the external electronic device corresponding to identification information, based on obtaining the identification information. In an embodiment, the electronic device 101 may identify whether the user has the right to use the function of accessing the external electronic device corresponding to the identification information, based on the identification information. In an embodiment, the electronic device 101 may transmit a request for allowing the external electronic device corresponding to the selected account to verify the user's right to use to the external electronic device. In an embodiment, the request may include encrypted information corresponding to the identification information. The external electronic device may verify the identification information based on the request transmitted by the electronic device 101. The external electronic device may transmit a response to the request to the electronic device 101 based on identifying that the identification information is valid. The electronic device 101 may complete establishment of the communication connection with the external electronic device by receiving the response to the request from the external electronic device.

In an embodiment, the subscription code may include an identifier based on image recognition such as a QR code, but is not limited thereto. In an embodiment, when the electronic device 101 establishes communication connection with the external electronic device based on the QR code, the electronic device 101 may establish communication connection with the external electronic device based on the QR code obtained by the camera module 180 even without displaying the window associated with account selection. For example, the QR code may include address information about the external electronic device. The electronic device 101 may establish communication connection with the external electronic device by accessing the address of the external electronic device corresponding to the QR code based on the address information corresponding to the external electronic device.

FIGS. 5A, 5B, 5C, 5D, 5E, and 5F are diagrams illustrating an example of establishing communication with an external electronic device (e.g., the server 108 of FIG. 1) by an electronic device 101 (e.g., the electronic device 101 of FIG. 2) according to various embodiments.

Figure 5A:
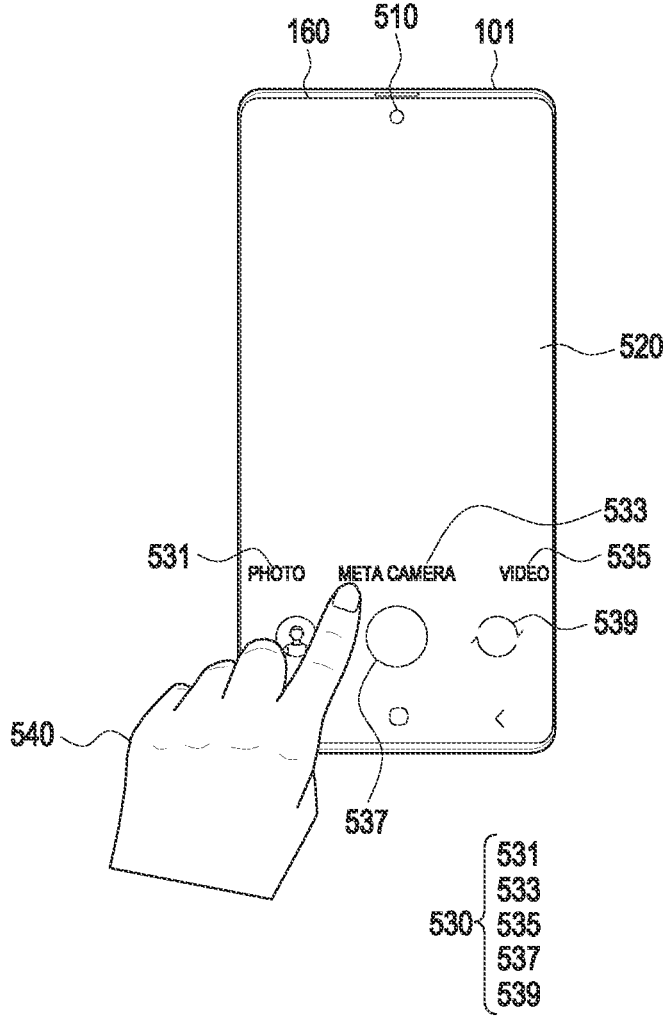

Referring to FIG. 5A, the electronic device 101 may display an execution screen 520 of a camera application through the display module 160. The electronic device 101 may display one or more objects 530 on the execution screen 520. In an embodiment, the electronic device 101 may control a camera module (e.g., the camera module 180 of FIG. 2) or transmit a request to an external electronic device, based on a user input to any one of the objects 530. In an embodiment, the user input 540 may include a touch event on the display module 160, but is not limited thereto. In an embodiment, the electronic device 101 may control the camera module 180 to obtain a preview image for capturing a still image, based on a user input to the photo mode object 531. The electronic device 101 may transmit a request for obtaining a preview image for capturing a still image to the external electronic device, based on the user input 540 to the object 533 for establishing communication with the external electronic device. The electronic device 101 may control the camera module 180 to obtain a still image based on a user input to the photograph object 537 in the photo mode. The electronic device 101 may change the operation mode of the camera application from photo mode to video mode based on a user input to the object 535 associated with the video mode. In the video mode, the electronic device 101 may control the camera module 180 to start or end recording of the video, based on a user input to the photograph object 537. The electronic device 101 may control the display module 160 to display an account selection window based on a user input to the object 533 for establishing communication with the external electronic device. In an embodiment, when the external electronic device establishing communication according to the user input to the object 533 is not predetermined, the electronic device 101 may display an account selection window. In an embodiment, the account selection window may be referred to as a "universal menu", but is not limited thereto. In an embodiment, the electronic device 101 may control the display module 160 to display a universal menu, based on a user input to the object 533. The electronic device 101 may control the camera module 180 to obtain a preview image based on the front camera 510 or the rear camera (not shown), based on a user input to the switch camera object 539. For example, the electronic device 101 may control the camera module 180 to obtain the preview image based on the front camera 510, based on obtaining a user input to the switch camera object 539 while obtaining the preview image based on the rear camera. While obtaining the preview image based on the front camera 510, the electronic device 101 may control the camera module 180 to obtain the preview image based on the rear camera, based on obtaining a user input to the switch camera object 539.

Figure 5B:
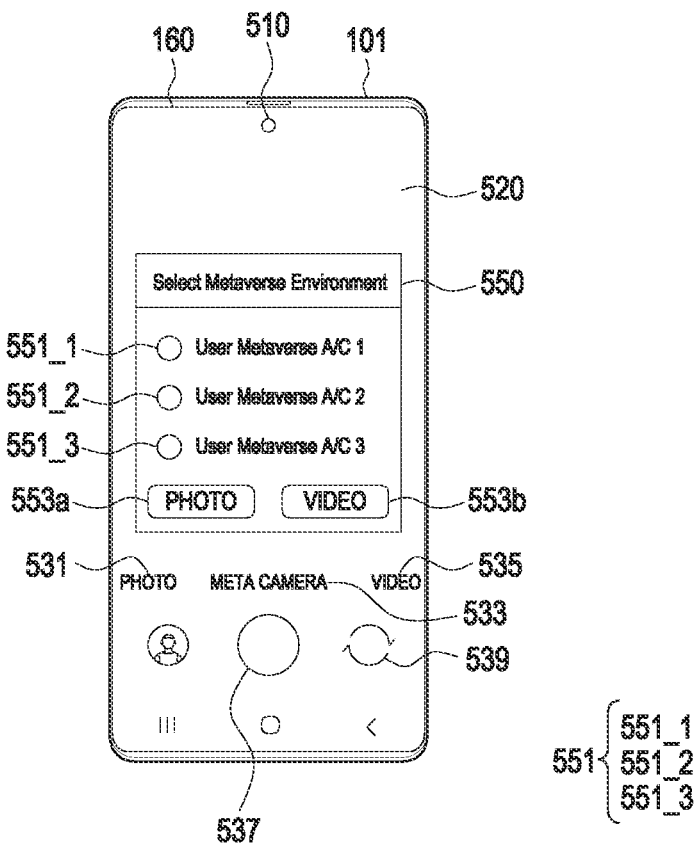

Referring to FIG. 5B, the electronic device 101 may control the display module 160 to display an account selection window 550 for selecting any one account from among one or more accounts, based on a user input to the object 533 for establishing communication with the external electronic device. In an embodiment, the account selection window 550 may include an object 551 for at least one account corresponding to at least one external electronic device. In an embodiment, the user input to the object may include an event of touching the display module 160, but is not limited thereto. In an embodiment, each of the one or more accounts may respectively correspond to one of one or more external electronic devices. For example, the electronic device 101 may display an identifier input window for establishing communication with the first external electronic device (not shown) through the display module 160, based on a user input to the first account object 551_1. The electronic device 101 may display an identifier input window for establishing communication with the second external electronic device (not shown) through the display module 160, based on a user input to the second account object 551_2. The electronic device 101 may display an identifier input window for establishing communication with the third external electronic device (not shown) through the display module 160, based on a user input to the third account object 551_3. In an embodiment, the account selection window 550 may further include a still image object 553a and a video object 553b. The electronic device 101 may change the settings of the camera module 180 into the still image mode for obtaining the still image of the first space including at least one virtual reality content, based on a user input to the still image object 553a. The electronic device 101 may change the settings of the camera module 180 into the video mode for obtaining a video of the first space including at least one virtual reality content, based on a user input to the video object 553b.

Referring to FIG. 5C, the electronic device 101 may display an identifier input window 560 through the display module 160, based on a user input to any one of the one or more objects 551 displayed on the account selection window 550. In an embodiment, the electronic device 101 may obtain a user identifier, based on a user input to the identifier input window 560. In an embodiment, the user identifier may include an ID and a password. The electronic device 101 may establish communication with the external electronic device based on a user input to the ID input window 561, the password input window 563, and the login object 565. In an embodiment, the electronic device 101 may transmit a request for allowing the external electronic device corresponding to the selected account to verify the user's right to use to the external electronic device. In an embodiment, the request may include encrypted information about the user identifier. The external electronic device may verify the user identifier based on the request transmitted by the electronic device 101. The external electronic device may transmit a response to the request to the electronic device 101 based on identifying that the user identifier is valid. The electronic device 101 may establish communication with the external electronic device by receiving the response to the request from the external electronic device.

In an embodiment, the electronic device 101 may display the identifier input window 560 before displaying the account selection window 550. The electronic device 101 may obtain a user identifier, based on a user input to the identifier input window 560. The electronic device 101 may identify whether the user has the right to use the function of accessing the external electronic device, based on the user identifier. The electronic device 101 may display the account selection window 550 based on identifying that the user has the right to use the function of accessing the external electronic device.

Referring to FIG. 5D, the electronic device 101 may display an identifier input window 560 through the display module 160, based on a user input to any one of the one or more objects 551 displayed on the account selection window 550. In an embodiment, the electronic device 101 may obtain a user identifier, based on a user input to the identifier input window 560. In an embodiment, the user identifier may include a subscription code. In an embodiment, the subscription code may include a combination of at least one of text and numbers. The electronic device 101 may establish communication with the external electronic device based on a user input to the subscription code input window 570. In an embodiment, the electronic device 101 may transmit a request for allowing the external electronic device corresponding to the selected account to verify the user's right to use to the external electronic device. In an embodiment, the request may include encrypted information about the subscription code. The external electronic device may verify the subscription code based on the request transmitted by the electronic device 101. The external electronic device may transmit a response to the request to the electronic device 101 based on identifying that the subscription code is valid. The electronic device 101 may establish communication with the external electronic device by receiving the response to the request from the external electronic device.

In an embodiment, the electronic device 101 may display the identifier input window 560 before displaying the account selection window 550. The electronic device 101 may obtain a subscription code, based on a user input to the identifier input window 560. The electronic device 101 may identify whether the user has the right to use the function of accessing the external electronic device, based on the subscription code. The electronic device 101 may display the account selection window 550 based on identifying that the user has the right to use the function of accessing the external electronic device.

Figure 5E:
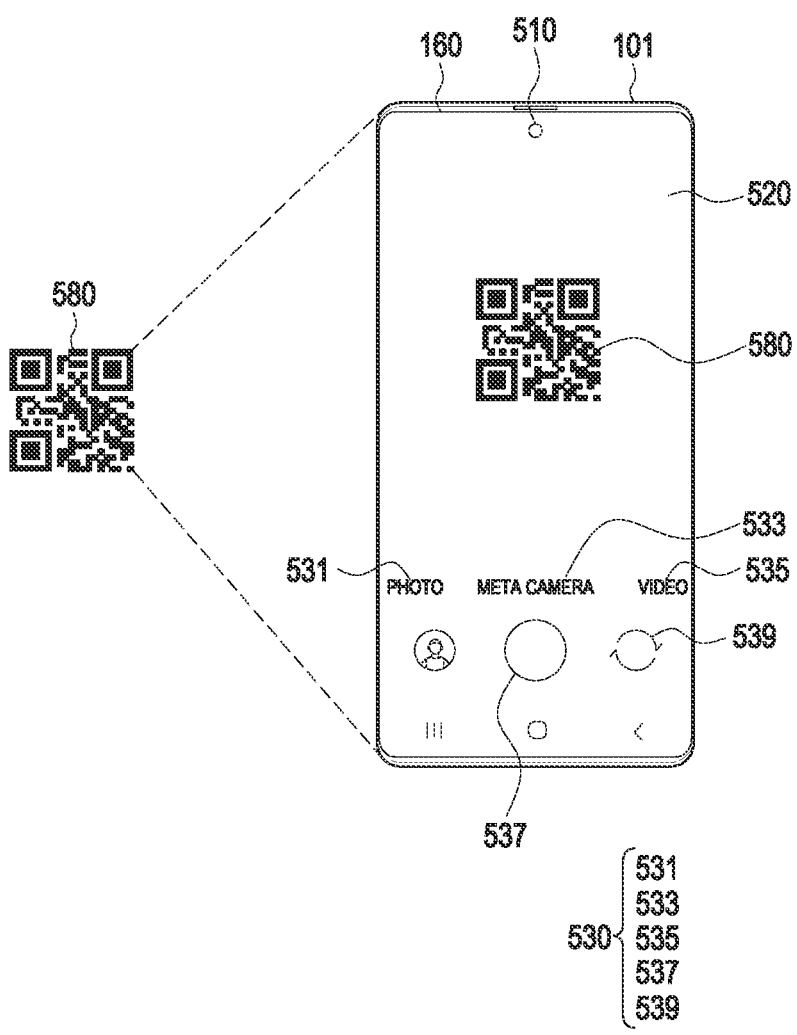

Referring to FIG. 5E, the electronic device 101 may establish communication with the external electronic device, based on the subscription code obtained by the camera module 180. In an embodiment, the subscription code may include an identifier based on image recognition such as a QR code 580, but is not limited thereto. In an embodiment, when the electronic device 101 establishes communication with the external electronic device based on the QR code 580, the electronic device 101 may establish communication with the external electronic device even without displaying the account selection window. For example, the QR code 580 may include address information about the external electronic device. The electronic device 101 may establish communication with the external electronic device by accessing the address of the external electronic device based on the address information corresponding to the external electronic device.

Figure 5F:
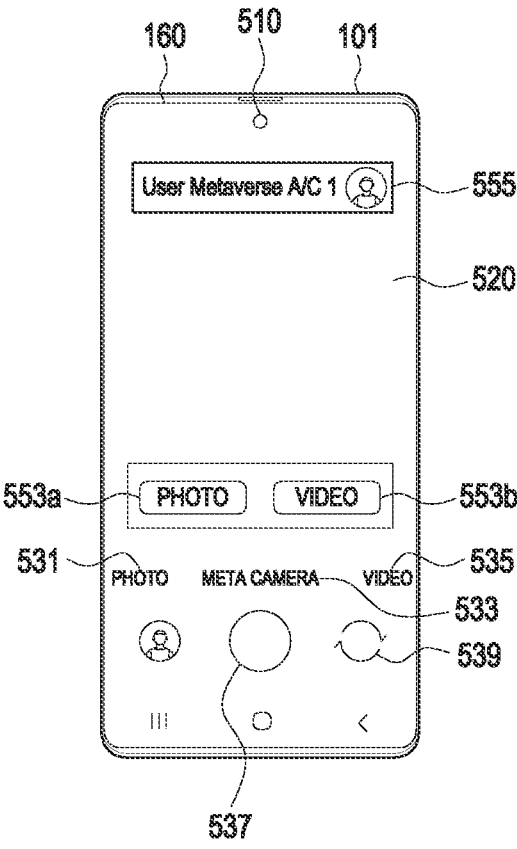

Referring to FIG. 5F, the electronic device 101 may control the display module 160 to display information related to an account corresponding to an external electronic device pre-connected to the electronic device 101 among one or more external electronic devices, based on a user input (e.g., the user input 540 of FIG. 5A) to the object 533 for establishing communication with the external electronic device. In an embodiment, the account-related information may include at least one of an ID, a nickname, an email address, or a profile. In an embodiment, the electronic device 101 may control the display module 160 to display the switch account object 555, based on a user input to the object 533. The electronic device 101 may control the display module 160 to display an account selection window (e.g., the account selection window 550 of FIG. 5B), based on a user input to the switch account object 555. The electronic device 101 may switch to another external electronic device based on a user input to an object (e.g., the object 551 for the account in FIG. 5B) for at least one account included in the account selection window.

In an embodiment, referring to FIG. 5F, the electronic device 101 may control the display module 160 to display information related to an account corresponding to an external electronic device having a history of last connection among one or more external electronic devices, based on a user input to the object 533 for establishing communication with the external electronic device. In an embodiment, the electronic device 101 may control the display module 160 to display the switch account object 555, based on a user input to the object 533. The electronic device 101 may control the display module 160 to display an account selection window, based on a user input to the switch account object 555. The electronic device 101 may switch to another external electronic device based on a user input to an object for at least one account included in the account selection window.

In an embodiment, referring to FIG. 5F, the electronic device 101 may display information related to the account corresponding to the subscription code, based on identifying (or scanning) the subscription code such as the QR code 580. In an embodiment, the electronic device 101 may control the display module 160 to display the switch account object 555 together with the account corresponding to the subscription code. The electronic device 101 may control the display module 160 to display an account selection window, based on a user input to the switch account object 555. The electronic device 101 may switch to another external electronic device based on a user input to an object for at least one account included in the account selection window.

Figure 6:
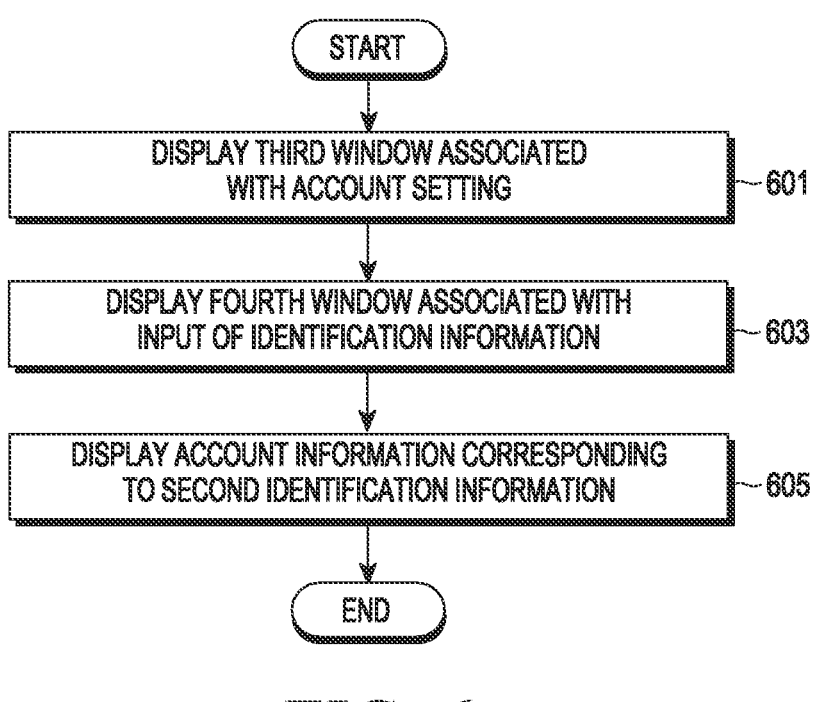
FIG. 6 is a flowchart illustrating an example operation of storing account information based on a user identifier by an electronic device according to various embodiments.

FIG. 6 is a flowchart illustrating an example operation of storing account information based on identification information by an electronic device according to various embodiments.

In an embodiment, the electronic device 101 may previously store account information corresponding to each of the one or more external electronic devices, based on a user input.

Referring to FIG. 6, in operation 601, in an embodiment, the electronic device 101 (e.g., the processor 120 of FIG. 2) may display a third window associated with account setting.

In an embodiment, the electronic device 101 may display an object associated with account setting on the execution screen (e.g., the execution screen 520 of FIG. 5) of the camera application through the display module (e.g., the display module 160 of FIG. 1 or FIG. 2). The electronic device 101 may display the window associated with account setting (e.g., account setting window) based on a user input to the object associated with account setting. In an embodiment, the user input may include a touch event on the display module 160, but is not limited thereto. In an embodiment, the window associated with account setting may include an object associated with add account. In an embodiment, the electronic device 101 may add, change, and/or delete one or more accounts respectively corresponding to the one or more external electronic devices, based on a user input to the window associated with account setting. In an embodiment, the electronic device 101 may store account information respectively corresponding to the one or more accounts based on the user input to the window associated with account setting. The electronic device 101 may establish communication connection with the external electronic device corresponding to the account information by executing the camera application even without installing one or more applications for accessing each of the one or more external electronic devices.

In operation 603, in an embodiment, the electronic device 101 may display a fourth window associated with input of identification information.

In an embodiment, the electronic device 101 may display the window associated with input of identification information, through the display module, based on a user input to the window associated with account setting. In an embodiment, the electronic device 101 may obtain, or identify, address information corresponding to the external electronic device, based on a user input. For example, the electronic device 101 may identify the external electronic device corresponding to the account information based on obtaining address information corresponding to the external electronic device by scanning the subscription code through the camera module. In an embodiment, the electronic device 101 may store account information corresponding to the identified external electronic device, based on at least some of user inputs to the ID input window, the password input window, and/or the login object. In an embodiment, the electronic device 101 may request validation from the external electronic device to verify the validity of the added account information. For example, the electronic device 101 may request validation from the external electronic device based on the address information about the external electronic device obtained based on the subscription code. For example, the request transmitted by the electronic device 101 may include encrypted account information. After verifying the validity of the account information, the external electronic device may transmit a response to the request to the electronic device 101. In an embodiment, when the account information is valid, the electronic device 101 may obtain a response for identifying that the registration of the account information is completed from the external electronic device. When the account information is invalid, the electronic device 101 may obtain a response for identifying that registration of the account information fails from the external electronic device.

In operation 605, in an embodiment, the electronic device 101 may display account information corresponding to second identification information.

In an embodiment, the electronic device 101 may display the added account information on the window associated with account setting, based on user input to the window associated with account setting. In an embodiment, the window associated with account setting may include an object associated with add account. The electronic device 101 may add one or more accounts respectively corresponding to the one or more external electronic devices by performing operations 601 and 603, based on a user input to the object associated with add account.

FIGS. 7A, 7B, 7C, 7D, 7E, and 7F are diagrams illustrating an example of storing account information based on a user identifier by an electronic device 101 (e.g., the electronic device 101 of FIG. 2) according to various embodiments.

Figures 7A, 7B:
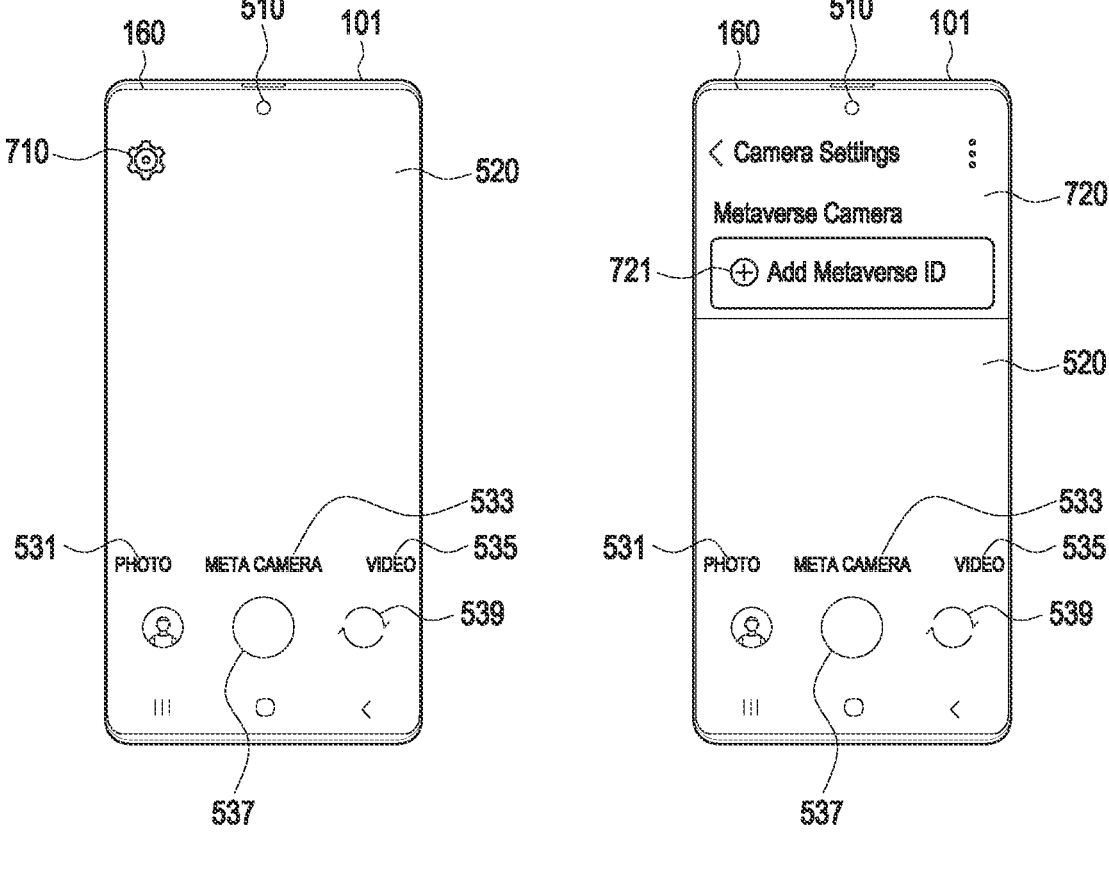

Referring to FIG. 7A, in an embodiment, the electronic device 101 may display an account setting object 710 on the execution screen 520 of the camera application through a display module (e.g., the display module 160 of FIG. 2). The electronic device 101 may display the account setting window based on a user input to the account setting object 710. In an embodiment, the user input may include a touch event on the display module 160, but is not limited thereto.

Referring to FIG. 7B, in an embodiment, the electronic device 101 may display an account setting window 720 through the display module 160, based on a user input. In an embodiment, the account setting window 720 may include an add account object 721. The electronic device 101 may display an identifier input window through the display module 160 based on a user input to the account setting window 720. The electronic device 101 may display, through the display module 160, at least one object 731 and

733 for selecting an identifier input scheme, based on a user input to the add account object 721 included in the account setting window 720. In an embodiment, the electronic device 101 may add, change, or delete one or more accounts respectively corresponding to the one or more external electronic devices, based on the account setting window 720. In an embodiment, the electronic device 101 may pre-store account information respectively corresponding to the one or more accounts based on the account setting window 720, thereby establishing communication with the external electronic device by executing the camera application even without installing one or more applications for accessing each of the one or more external electronic devices. In an embodiment, the account information may include, but is not limited to, at least one of an ID, a phone number, an email address, or a password.

Figures 7C, 7D:
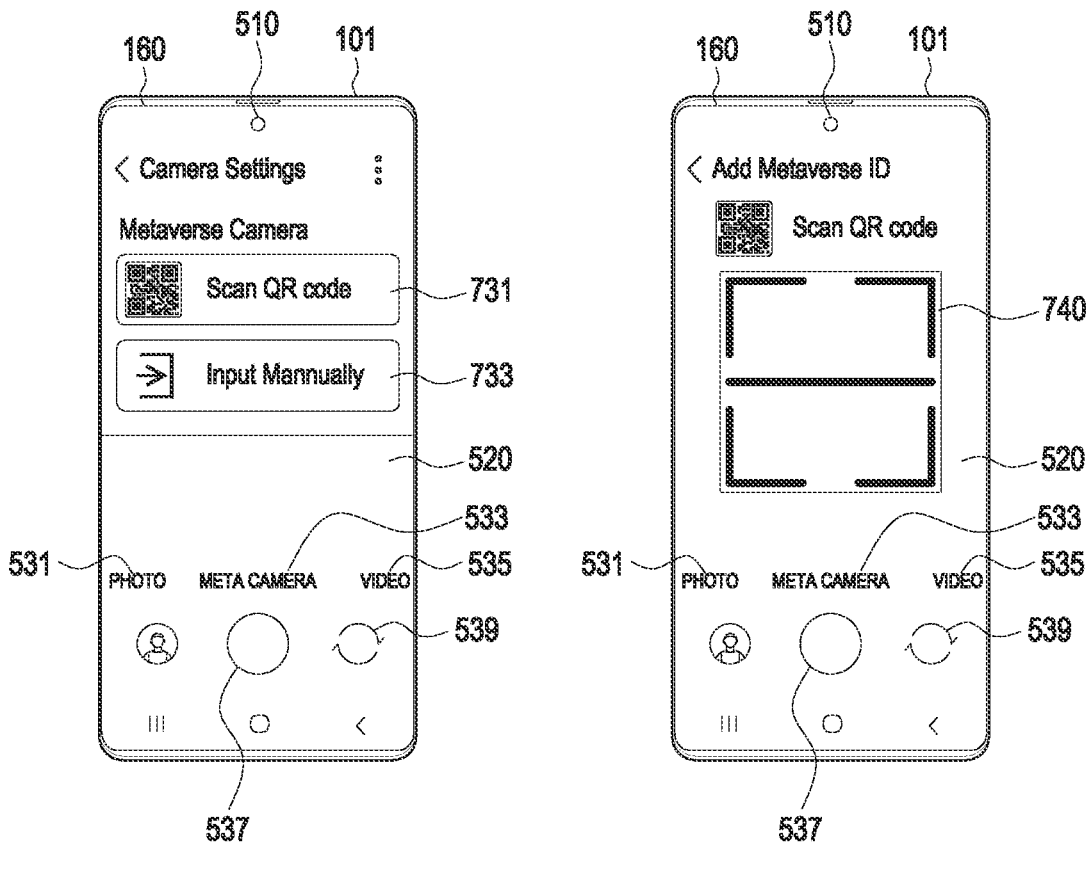

Referring to FIG. 7C, in an embodiment, the electronic device 101 may display at least one object for selecting an identifier input scheme through the display module 160, based on a user input to an add account object (e.g., the add account object 721 of FIG. 7B). In an embodiment, the object may include an object 731 for a subscription code scan and/or an object 733 for an identifier input. The electronic device 101 may receive account information in various ways based on displaying one or more objects for selecting an identifier input scheme. In an embodiment, the user input may include a touch event on the display module 160, and the user input is not limited to the above-described example.

Referring to FIG. 7D, in an embodiment, the electronic device 101 may display an area 740 for scanning a subscription code through the display module 160, based on a user input to an object (e.g., the object 731 of FIG. 7C) for scanning the subscription code. In an embodiment, the electronic device 101 may obtain a preview image including the subscription code through the camera module (e.g., the camera module 180 of FIG. 2). For example, the subscription code may include a combination of text and/or numbers, or may include an image such as a QR code (e.g., the QR code 580 of FIG. 5E). The subscription code is not limited to the above-described example. The electronic device 101 may display a preview image obtained by the camera module 180 through the display module 160. In an embodiment, the electronic device 101 may obtain address information about the external electronic device, based on scanning the subscription code. For example, the electronic device 101 may identify the external electronic device corresponding to the subscription code by obtaining address information about the external electronic device based on obtaining the subscription code. Based on identifying that the subscription code is positioned in the area 740, the electronic device 101 may store account information for establishing communication with the external electronic device.

Referring to FIG. 7E, in an embodiment, the electronic device 101 may display an identifier input window 750 through the display module 160, based on a user input to an object (e.g., the object 733 of FIG. 7C) for the identifier input.

In an embodiment, the electronic device 101 may store account information corresponding to the identified external electronic device, based on a user input to the ID input window 751, the password input window 753, and the login object 755. In an embodiment, the electronic device 101 may request validation from the external electronic device to verify the validity of the added account information. For example, the electronic device 101 may request validation from the external electronic device based on the address information about the external electronic device obtained based on the subscription code. The request transmitted by the electronic device 101 may include encrypted account information. After verifying the validity of the account information, the external electronic device may transmit a response to the request to the electronic device 101. In an embodiment, when the account information is valid, the electronic device 101 may obtain a response for identifying that the registration of the account information is completed from the external electronic device. When the account information is invalid, the electronic device 101 may obtain a response for identifying that registration of the account information fails from the external electronic device.

Referring to FIG. 7F, in an embodiment, the electronic device 101 may display the added account information 761 on the account setting window 760, based on obtaining the user identifier. In an embodiment, the electronic device 101 may display the added account information 761 on the account setting window 760, based on storing the account information corresponding to the identified external electronic device. In an embodiment, the account setting window 760 may include a change account object 763 and an add account object 721. The electronic device 101 may change the added account information based on a user input to the change account object 763. The electronic device 101 may add one or more accounts respectively corresponding to the one or more external electronic devices, based on a user input to the add account object 721.

Figure 8:
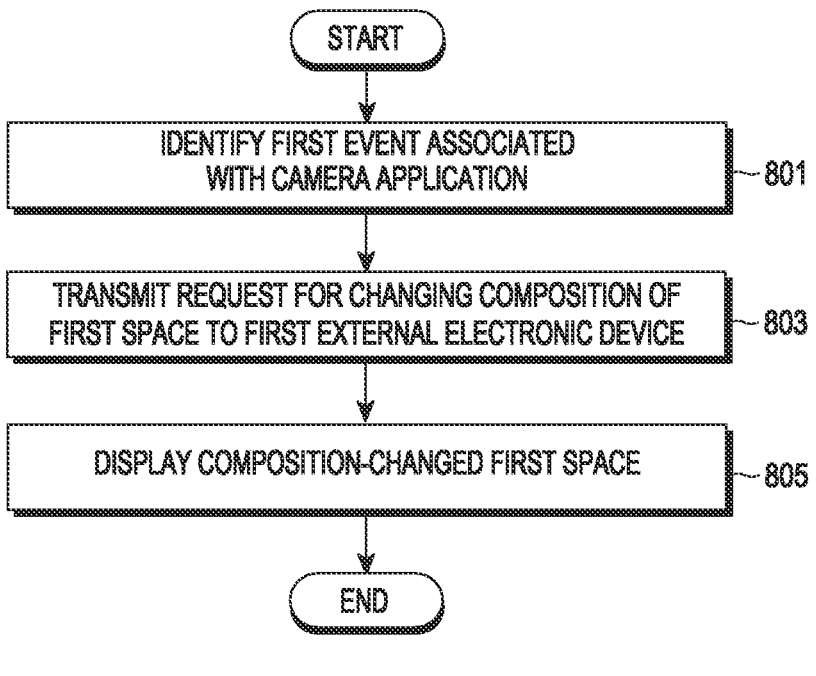
FIG. 8 is a flowchart illustrating an example operation of displaying changed virtual reality content based on a change in the settings of a camera module by an electronic device according to various embodiments.

FIG. 8 is a flowchart illustrating an example operation of displaying changed virtual reality content based on a change in the settings of a camera application by an electronic device according to various embodiments.

Referring to FIG. 8, in operation 801, in an embodiment, the electronic device 101 (e.g., the processor 120 of FIG. 2) may identify a first event associated with the camera application.

In an embodiment, the electronic device 101 may identify the first event associated with the camera application. In an embodiment, an event associated with the camera application may include a user input for setting operating mode of the camera application into a rear camera mode. The event associated with the camera application may include a user input for setting operating mode of the camera application into a selfie mode. The event associated with the camera application may include a zoom-in event, or a zoom-out event. In an embodiment, the event associated with the camera application may include an event associated with movement of the electronic device 101. The electronic device 101 may identify an event associated with a change in the posture of the electronic device 101 using a sensor module (e.g., the sensor module 176 of FIG. 1).

In operation 803, in an embodiment, the electronic device 101 may transmit a request for changing the composition of the first space to a first external electronic device.

In an embodiment, the electronic device 101 may transmit a request for changing the composition of the first space to the first external electronic device, based on identifying of the first event associated with the camera module 180. In an embodiment, the composition of the first space may include at least one of the direction, angle, and/or magnification of the screen within the FOV of the avatar. In an embodiment, the electronic device 101 may transmit a request for causing the external electronic device to zoom-in the virtual space content to the external electronic device with which the communication connection is established, based on identifying the event associated with a change in the settings of the camera application to zoom in the subject outside the electronic device 101. The electronic device 101 may transmit a request for causing the external electronic device to zoom out the virtual space content to the external electronic device with which the communication connection is established, based on identifying the event associated with the change in the settings of the camera application to zoom out the subject outside the electronic device 101. In an embodiment, the electronic device 101 may transmit a request for moving the avatar in the first space to the external electronic device, based on a user input. In an embodiment, the user input may include a touch event on the display module 160, an event for detecting a movement of the user of the electronic device 101, or an event associated with a change in the posture of the electronic device 101, but is not limited thereto.

In operation 805, in an embodiment, the electronic device 101 may display a composition-changed first space.

In an embodiment, the electronic device 101 may display the composition-changed first space through the display module 160, based on reception of the data generated based on the request for changing the composition of the first space from the external electronic device. In an embodiment, the electronic device 101 may display, through the display module 160, the composition-changed first space corresponding to the changed settings of the camera application.

In an embodiment, the electronic device 101 may display the composition-changed first space through the display module 160, based on receiving the data generated by the external electronic device based on the request for moving the avatar in the first space.

Figure 9:
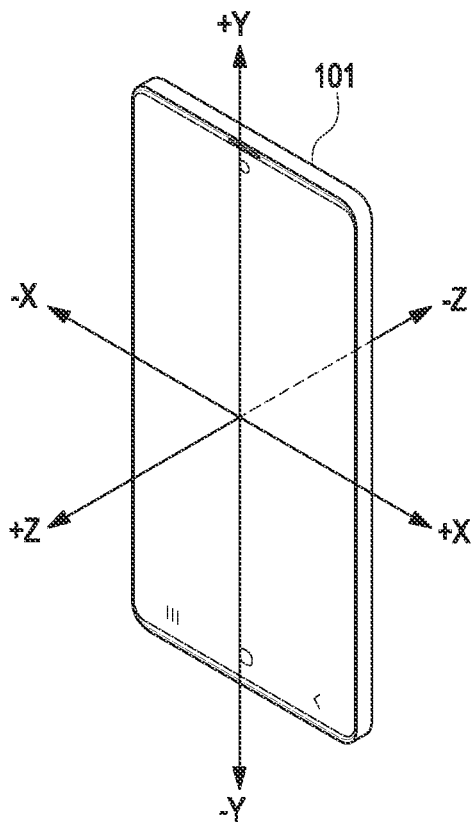
FIG. 9 is a diagram illustrating an example of changing the settings of a camera module based on detecting a movement by an electronic device according to various embodiments.

FIG. 9 is a diagram illustrating an example of changing the settings of a camera module (e.g., the camera module 180 of FIG. 2) based on detecting a movement by an electronic device 101 (e.g., the electronic device 101 of FIG. 2) according to various embodiments.

Referring to FIG. 9, in an embodiment, the electronic device 101 may detect a movement of the electronic device 101, based on data obtained by a sensor module (e.g., the sensor module 176 of FIG. 1). In an embodiment, the electronic device 101 (e.g., the sensor module 176) may obtain the movement in the vertical direction, based on detecting the movement of the electronic device 101 in the y-axis direction. The electronic device 101 may obtain the movement in the horizontal direction based on detecting the movement in the x-axis direction. The electronic device 101 may obtain the rotational movement based on detecting the movement in the z-axis direction. In an embodiment, the electronic device 101 may obtain at least one of changes in the position, direction, and angle of the electronic device 101 based on detecting the movement in the x-axis, y-axis, and/or z-axis directions. The electronic device 101 may transmit data obtained by the sensor module 176 to the external electronic device connected with the electronic device 101 through a second network (e.g., the second network 199 of FIG. 1). For example, the electronic device may transmit data obtained by the sensor module 176 to the external electronic device based on a representational state transfer (REST) API. The electronic device 101 may change at least one of the position, direction, and/or angle of the virtual reality screen according to the movement of the electronic device 101 by transmitting data obtained by the sensor module 176 to the external electronic device.

Figures 10A, 10B:
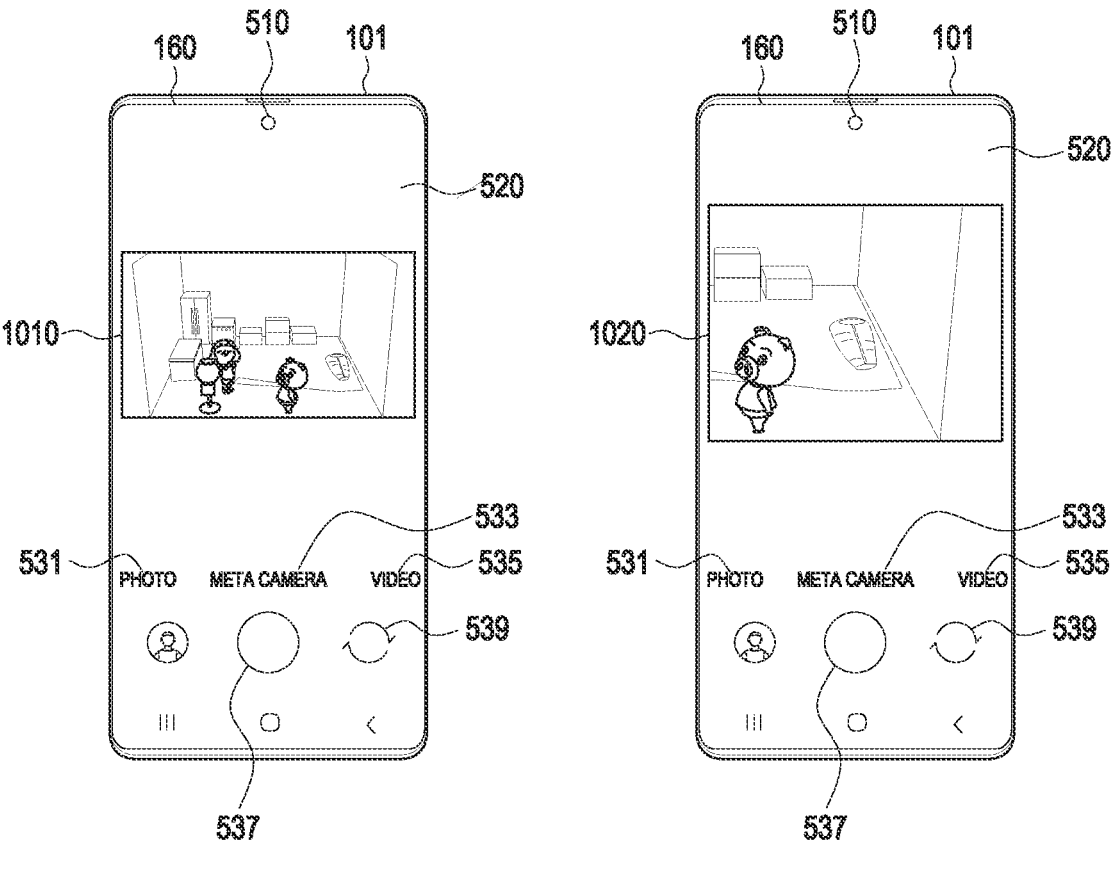
FIGS. 10A, 10B, and 10C are diagrams illustrating an example of displaying changed virtual reality content based on a change in the settings of a camera module by an electronic device according to various embodiments.
Figure 10C:
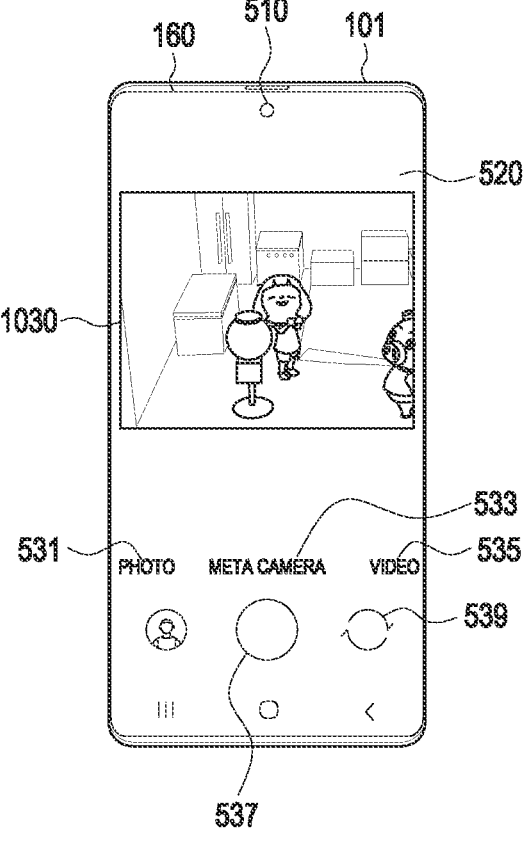

FIGS. 10A, 10B, and 10C are diagrams illustrating an example of displaying changed virtual reality content based on a change in the settings of a camera module (e.g., the camera module 180 of FIG. 2) by an electronic device 101 (e.g., the electronic device 101 of FIG. 2) according to various embodiments.

Referring to FIG. 10A, after establishing communication with an external electronic device, the electronic device 101 may display a first space 1010 on an execution screen 520 of a camera application, based on data obtained from the external electronic device. In an embodiment, the first space 1010 may include one or more virtual reality contents. The VR content shown in FIG. 10A is an example, and is not limited to that shown in FIG. 10A.

In an embodiment, the electronic device 101 may transmit a request for obtaining a still image or a video of the first space 1010 to the external electronic device, based on a user input to the photograph object 537. In an embodiment, the user input to the photograph object 537 may include an event of touching at least a partial area of the display module 160 corresponding to the photograph object 537, but is not limited thereto. In an embodiment, the electronic device 101 may receive the obtained still image or video from the external electronic device through the communication module 190.

In an embodiment, the electronic device 101 may change the settings of the camera module 180 based on a user input to at least a partial area of the display module 160. For example, the electronic device 101 may change the settings of the camera module 180 to zoom out from the subject, based on obtaining a pinch event for at least a partial area of the display module 160. Based on detecting a zoom-in event, the electronic device 101 may transmit a request for changing the composition of the first space 1010 to the external electronic device. In an embodiment, the electronic device 101 may change the settings of the camera module 180 to zoom in the subject, based on obtaining a spread event on at least a partial area of the display module 160. The user input and the settings of the camera module 180 corresponding to the user input are an example, and are not limited to the above-described example.

In an embodiment, the electronic device 101 may change the settings of the camera module 180 based on detecting the movement of the electronic device 101. In an embodiment, the settings of the camera module 180 may include the direction and/or the angle of the preview image obtained by the front camera 510 or the rear camera. The electronic device 101 may change the settings of the camera module 180 based on detecting at least one of horizontal and vertical movement and/or rotation of the electronic device 101.

Referring to FIG. 10B, in an embodiment, the electronic device 101 may display a zoomed-in first space 1020, on the execution screen 520 of the camera application, based on detecting the event of zooming in the subject. Based on detecting a zoom-in event, the electronic device 101 may transmit a request for changing the composition of the first space 1010 to the external electronic device. In an embodiment, the electronic device 101 may display the zoomed-in first space 1020 through the display module 160, based on reception of the data generated based on the request from the external electronic device. In an embodiment, the electronic device 101 may transmit a request for obtaining a still image or a video of the zoomed-in first space 1020 to the external electronic device, based on a user input to the photograph object 537. In an embodiment, the user input to the photograph object 537 may include an event of touching at least a partial area of the display module 160 corresponding to the photograph object 537, but is not limited thereto. In an embodiment, the electronic device 101 may receive a still image or a video of the zoomed-in first space 1020 from the external electronic device through the communication module 190.

Referring to FIG. 10C, in an embodiment, the electronic device 101 may display the composition-changed first space 1030 on the execution screen 520 of the camera application based on detecting a change in at least one of the direction and angle of the camera module 180. The electronic device 101 may transmit a request for changing the composition of the first space 1010 to the external electronic device, based on detecting a change in at least one of the direction and the angle of the camera module 180. In an embodiment, the electronic device 101 may display the composition-changed first space 1030 through the display module 160, based on reception of the data generated based on the request from the external electronic device. In an embodiment, the electronic device 101 may transmit a request for obtaining a still image or a video of the composition-changed first space 1030 to the external electronic device, based on a user input to the photograph object 537. In an embodiment, the user input to the photograph object 537 may include an event of touching at least a partial area of the display module 160 corresponding to the photograph object 537, but is not limited thereto.

Figure 11:
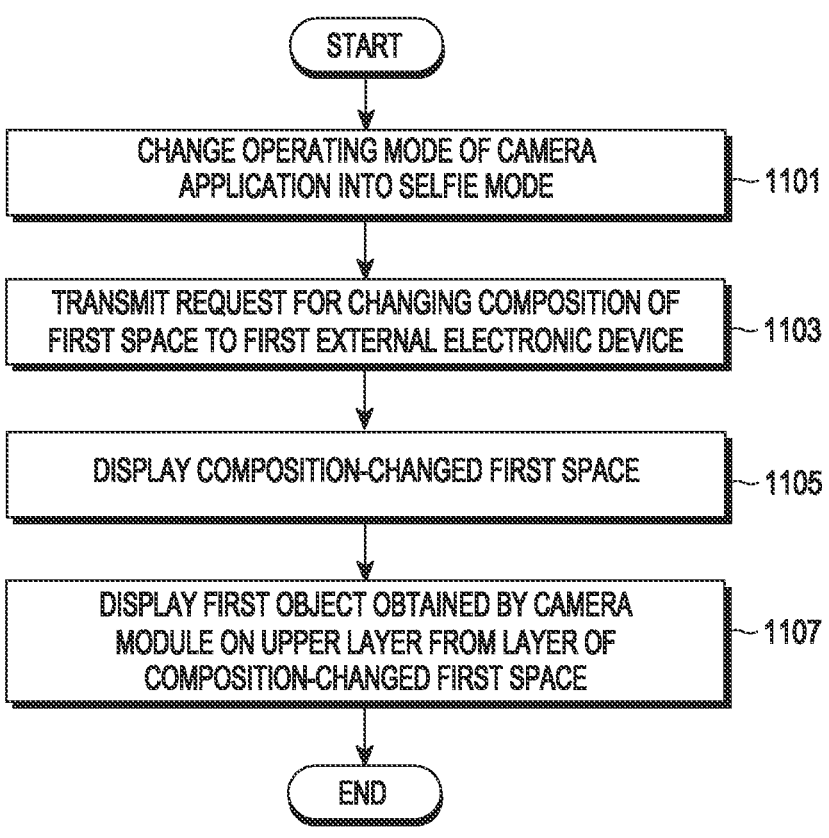
FIG. 11 is a flowchart illustrating an example operation of displaying an object obtained by a camera module and changed virtual reality content based on a change in the settings of the camera module by an electronic device according to various embodiments.

FIG. 11 is a flowchart illustrating an example operation of displaying an object obtained by a camera module and changed virtual reality content based on a change in the settings of the camera application by an electronic device according to various embodiments.

Referring to FIG. 11, in operation 1101, in an embodiment, the electronic device 101 (e.g., the processor 120 of FIG. 2) may change the operating mode of the camera application into the selfie mode.

In an embodiment, the electronic device 101 may change the operating mode of the camera application into the selfie mode based on a user input. In the selfie mode, the electronic device 101 may obtain an image including the background of virtual reality content, based on the front camera (e.g., the front camera 510 of FIG. 5). In an embodiment, the obtained image may include an object obtained by the front camera 510.

In operation 1103, in an embodiment, the electronic device 101 may transmit a request for changing the composition of the first space to a first external electronic device.

In an embodiment, the electronic device 101 may transmit a request for changing the composition of the first space in the opposite direction to the external electronic device, based on changing the operating mode of the camera application into the selfie mode. For example, the electronic device 101 may transmit a request for changing the direction of the FOV of the avatar to the opposite direction to the external electronic device.

In operation 1105, in an embodiment, the electronic device 101 may display a composition-changed first space.

In an embodiment, the electronic device 101 may receive data generated based on the request for changing the composition of the first space from the external electronic device. The electronic device 101 may display the first space having a composition changed in the opposite direction through the display module (e.g., the display module 160 of FIG. 1 or FIG. 2), based on the data received from the external electronic device. In an embodiment, the electronic device 101 may display, through the display module 160, the composition-changed first space corresponding to the changed settings of the camera application.

In operation 1107, in an embodiment, the electronic device 101 may display a first object obtained by the camera module 180 on an upper layer from the layer of the composition-changed first space.

In an embodiment, the electronic device 101 may recognize an object from an image obtained by the camera module 180, based on a pre-trained image recognition model. The image recognition model may learn a learning dataset including one or more images including a preset object. The image recognition model may be verified based on a verification dataset including one or more images labeled with a correct answer value for the object. The pre-trained image recognition model may output an object included in the input image based on receiving the image. For example, the image recognition model pre-trained to recognize a person or an animal may output a person or an animal included in the image. In an embodiment, the image recognition model may obtain only an area corresponding to the recognized person or animal by removing pixel values of the area other than the recognized person or animal. In an embodiment, the electronic device 101 may input the image obtained by the front camera 510 to the pre-trained image recognition model. The electronic device 101 may obtain only the area corresponding to the person and/or the animal included in the image obtained by the front camera 510, based on the output of the image recognition model. The electronic device 101 may display the obtained object on an upper layer than the layer of the composition-changed first space.

In an embodiment, the electronic device 101 may display the composite image obtained by performing operations 1105 and 1107 through the display module 160. In an embodiment, in the selfie mode, the electronic device 101 may display a mixed reality (MR) image by synthesizing an image obtained by the camera module 180 and an image including virtual reality content.

Figure 12A:
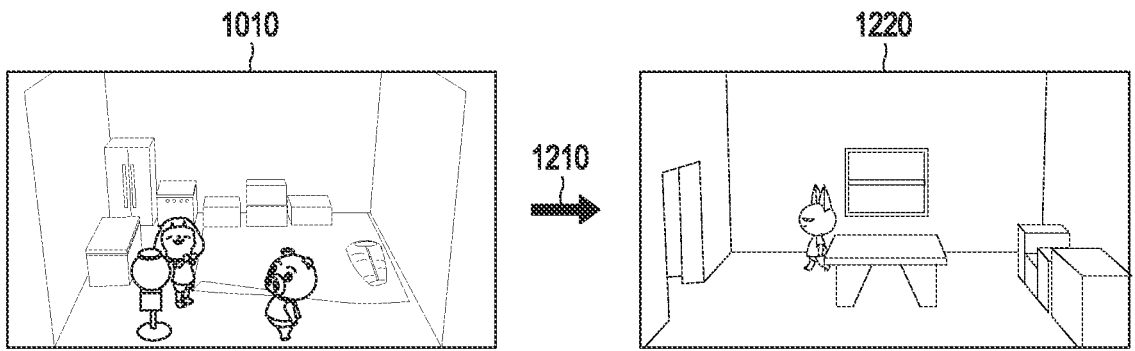
FIGS. 12A, 12B, and 12C are diagrams illustrating an example of displaying an object obtained by a camera module and changed virtual reality content based on a change in the settings of the camera module by an electronic device according to various embodiments.
Figure 12B:
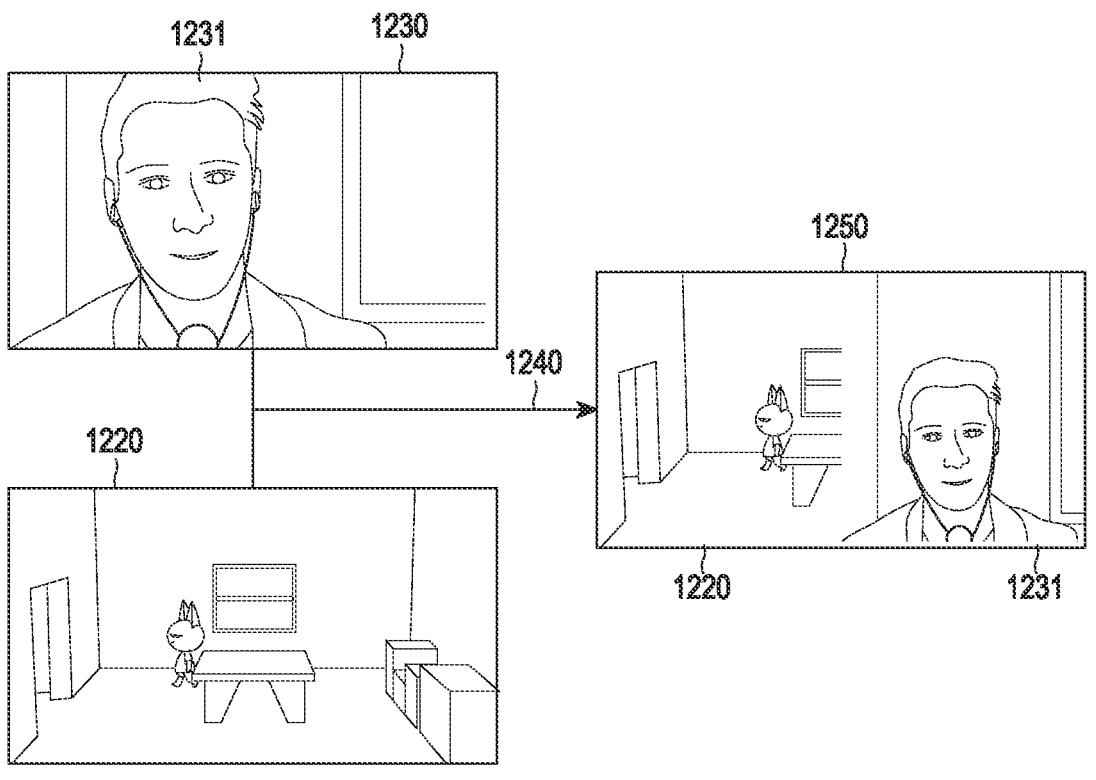
Figure 12C:
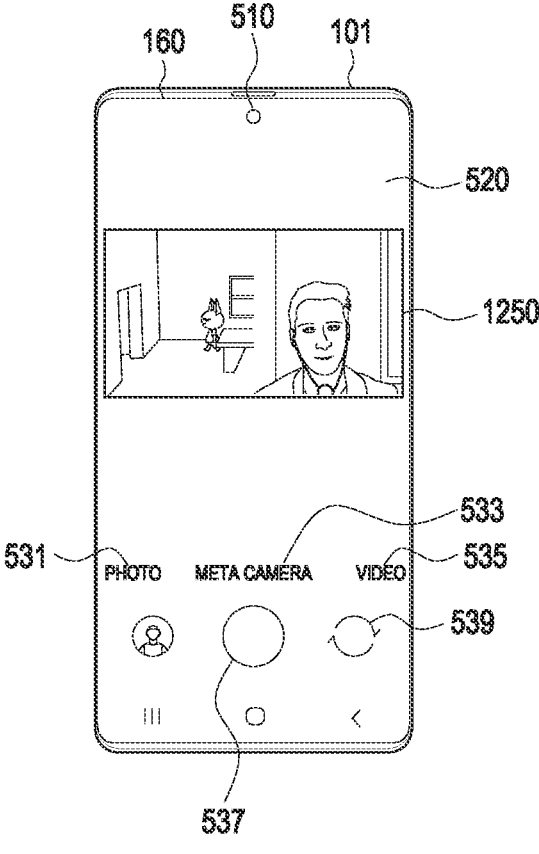

FIGS. 12A, 12B, and 12C are diagrams illustrating an example of displaying an object obtained by a camera module (e.g., the camera module 180 of FIG. 2) and changed virtual reality content based on a change in the settings of the camera module 180 by an electronic device (e.g., the electronic device 101 of FIG. 2) according to various embodiments.

Referring to FIG. 12A, in an embodiment, the electronic device 101 may transmit a request for changing (1210) the composition of the first space 1010 to the external electronic device, based on changing the settings of the camera module 180 into the selfie mode. For example, the electronic device 101 may transmit a request for changing the direction of the FOV of the avatar corresponding to the electronic device 101 in the virtual reality space to the opposite direction to the external electronic device. In an embodiment, the composition-changed first space 1220 may include a screen of a virtual reality space opposite to the first space 1010 before the composition is changed. In an embodiment, the electronic device 101 may change the settings of the camera module 180 into the selfie mode based on a user input. The user input may include a touch event on an object for activating the front camera (e.g., the front camera 510 of FIG. 5) among one or more objects displayed on the execution screen of the camera application, but is not limited thereto.

Referring to FIG. 12B, in an embodiment, the electronic device 101 may obtain a composite image 1250 of an image obtained by the camera module 180 and an image of a virtual reality space by displaying an object 1231 obtained by the front camera 510 on the upper layer than the layer of the composition-changed first space 1220. In an embodiment, the electronic device 101 may recognize the object 1231 from the image obtained by the camera module 180, based on a pre-trained image recognition model. The image recognition model which overlaps that of FIG. 11 is skipped from description. In an embodiment, the electronic device 101 may input the image 1230 obtained by the front camera 510 to the image recognition model. The electronic device 101 may obtain only an area corresponding to the object 1231 included in the image 1230 obtained by the front camera 510, based on the output of the image recognition model. The electronic device 101 may display the obtained object 1231 on an upper layer than the layer of the composition-changed first space. In an embodiment, the electronic device 101 may synthesize (1240) the obtained object 1231 and the image 1220 having a composition in the direction opposite to that of the first space.

Referring to FIG. 12C, in an embodiment, the electronic device 101 may display the obtained composite image 1250 through the display module 160. In an embodiment, in the selfie mode, the electronic device 101 may display a mixed reality image by synthesizing the image 1230 obtained by the camera module 180 and the image 1220 including virtual reality content.

Figure 13:
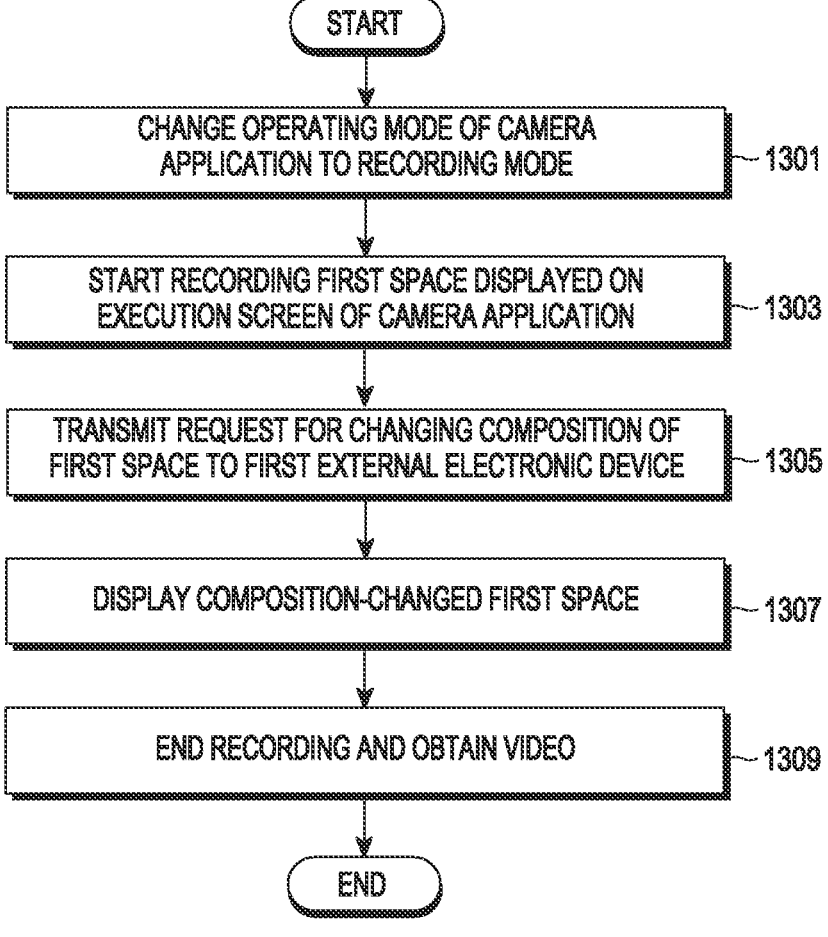
FIG. 13 is a flowchart illustrating an example operation of obtaining a video associated with virtual reality content by an electronic device according to various embodiments.

FIG. 13 is a flowchart illustrating an example operation of obtaining a video associated with virtual reality content by an electronic device according to various embodiments.

Referring to FIG. 13, in operation 1301, in an embodiment, the electronic device 101 (e.g., the processor 120 of FIG. 2) may change an operating mode of the camera application into a recording mode.

In an embodiment, the electronic device 101 may change the operating mode of the camera application into the recording mode, based on a user input to the object associated with video acquisition (e.g., the video object 553b of FIG. 5B) included in the window associated with account selection (e.g., the account selection window 550 of FIG. 5B).

In operation 1303, in an embodiment, the electronic device 101 may start recording the first space displayed on the execution screen of the camera application.

In an embodiment, after establishing communication connection with the external electronic device, the electronic device 101 may display the first space including virtual reality content through the display module 160, based on data obtained from the external electronic device. The electronic device 101 may start recording the first space displayed through the display module 160, based on the user input to the photograph object (e.g., the photograph object 537 of FIG. 5). In an embodiment, the user input may include a touch event on at least a partial area of the display module 160 corresponding to the photograph object 537, but is not limited thereto.

In operation 1305, in an embodiment, the electronic device 101 may transmit a request for changing the composition of the first space to the first external electronic device.

In an embodiment, the electronic device 101 may transmit a request for changing the composition of the first space to the external electronic device to which the communication connection is established based on identifying the first event associated with the camera application while recording the first space. In an embodiment, the electronic device 101 may transmit a request for changing the composition of the first space 1010 in the opposite direction to the external electronic device, based on identifying an event for changing the operating mode of the camera application into the selfie mode while recording the first space.

In operation 1307, in an embodiment, the electronic device 101 may display the composition-changed first space through the display module 160.

In an embodiment, the electronic device 101 may display the composition-changed first space through the display module 160, based on reception of the data generated based on the request from the external electronic device. The electronic device 101 may display the composition-changed first space based on changing the settings of the camera application while recording the first space.

In operation 1309, in an embodiment, the electronic device 101 may end recording and may obtain a video for the first space.

In an embodiment, the electronic device 101 may end recording of the first space based on a user input and may obtain a video of the first space. In an embodiment, the electronic device 101 may end recording of the first space based on a user input to the photograph object 537. The electronic device 101 may obtain a video from a time when recording of the first space starts to a time when recording of the first space ends. In an embodiment, the electronic device 101 may store the obtained video. The electronic device 101 may store address information about the first space in metadata of the obtained video. The electronic device 101 may obtain the data regarding the first space by establishing communication connection with the external electronic device even without one or more sequential user inputs based on the address information about the first space stored in the metadata of the video.

An electronic device according to an example embodiment may comprise a communication module comprising communication circuitry, a camera module comprising a camera, a display module comprising a display, and at least one processor operatively connected to the communication module, the camera module, and the display module. one or more of the at least one processor may be configured to execute a camera application. One or more of at least one processor may be configured to establish a communication connection with a first external electronic device corresponding to first identification information through the communication module based on obtaining first identification information while the camera application is executed. One or more of the at least one processor may be configured to display, through the display module, a first space on the execution screen of the camera application based on data received from the first external electronic device based on the communication connection. One or more of the at least one processor may be configured to transmit a request for changing a composition of the first space to the first external electronic device based on identifying a first event associated with the camera application. One or more of the at least one processor may be configured to display the composition-changed first space on the execution screen of the camera application through the display module based on receiving data generated based on the request, from the first external electronic device. One or more of the at least one processor may be configured to obtain an image of the composition-changed first space based on an input.

In an example embodiment, one or more of the at least one processor may be configured to display a first window associated with an account selection through the display module based on an input. One or more of the at least one processor may be configured to display a second window associated with input of identification information through the display module based on an input to the first window. One or more of the at least one processor may be configured to establish the communication connection with the first external electronic device corresponding to the first identification information based on obtaining the first identification information based on an input to the second window.

In an example embodiment, the first window may include at least one object corresponding to at least one account for establishing communication connection with at least one external electronic device.

In an example embodiment, one or more of the at least one processor may be configured to display a third window associated with an account setting through the display module based on an input. One or more of the at least one processor may be configured to display a fourth window associated with input of identification information through the display module based on an input to the third window. One or more of the at least one processor may be configured to display account information corresponding to second identification information on a fifth window based on obtaining the second identification information.

In an example embodiment, one or more of the at least one processor may be configured to, as at least part of transmitting the request for changing the composition of the first space to the first external electronic device based on identifying the first event associated with the camera application, transmit, to the first external electronic device, the request for changing the composition of the first space based on identifying a zoom-in event or a zoom-out event associated with the camera application.

In an example embodiment, one or more of the at least one processor may be configured to, as at least part of transmitting the request for changing the composition of the first space to the first external electronic device based on identifying the first event associated with the camera application, transmit, to the first external electronic device, the request for changing composition of the first space based on identifying an event associated with a change in a posture of the electronic device.

In an example embodiment, on or more of the at least one processor may be configured to change an operating mode of the camera application into a selfie mode based on an input. One or more of the at least one processor may be configured to transmit the request for changing the composition of the first space to the first external electronic device based on changing the operating mode of the camera application into the selfie mode. One or more of the at least one processor may be configured to display the composition-changed first space through the display module based on receiving data generated based on the request, from the first external electronic device. One or more of the at least one processor may be configured to display a first object obtained by a camera module of the electronic device on an upper layer from a layer of the composition-changed first space.

In an example embodiment, one or more of the at least one processor may be configured to input an image obtained by the camera module to a first object recognition model. One or more of the at least one processor may be configured to obtain the first object as an output of the first object recognition model.

In an example embodiment, one or more of the at least one processor may be configured to change an operating mode of the camera application to a recording mode based on an input. One or more of the at least one processor may be configured to start recording the first space displayed on the execution screen of the camera application through the display module based on an input. One or more of the at least one processor may be configured to transmit a request for changing a composition of the first space to the first external electronic device based on identifying a first event associated with the camera application while recording the first space. One or more of the at least one processor may be configured to display the composition-changed first space on the execution screen of the camera application through the display module based on receiving data generated based on the request, from the first external electronic device. One or more of the at least one processor may be configured to end the recording based on an input and obtain a video for the first space.

In an example embodiment, the identification information may include at least one of an ID, a password, or a subscription code.

A method for obtaining an image related to virtual reality content by an electronic device according to an example embodiment may comprise executing a camera application. The method may comprise establishing a communication connection with a first external electronic device corresponding to first identification information through communication circuitry of a communication module of the electronic device based on obtaining first identification information while the camera application is executed. The method may comprise displaying, through a display of a display module of the electronic device, a first space on the execution screen of the camera application based on data received from the first external electronic device. The method may comprise transmitting a request for changing a composition of the first space to the first external electronic device based on identifying a first event associated with the camera application. The method may comprise displaying the composition-changed first space on the execution screen of the camera application through a display of the display module based on receiving data generated based on the request, from the first external electronic device. The method may comprise obtaining an image of the composition-changed first space based on an input.

In an example embodiment, the method may further comprise displaying a first window associated with an account selection through the display module based on an input. The method may comprise displaying a second window associated with input of identification information through the display module based on an input to the first window. The method may comprise establishing the communication connection with the first external electronic device corresponding to the first identification information based on obtaining the first identification information based on an input to the second window.

In an example embodiment, the first window may include at least one object corresponding to at least one account for establishing communication connection with at least one external electronic device.

In an example embodiment, the method may further comprise displaying a third window associated with an account setting through the display module based on an input. The method may further comprise displaying a fourth window associated with input of identification information through the display module based on an input to the third window. The method may further comprise displaying added account information corresponding to second identification information on a fifth window based on obtaining the second identification information.

In an example embodiment, in the method, transmitting the request for changing the composition of the first space to the first external electronic device based on identifying the first event associated with the camera application may comprise transmitting, to the first external electronic device, the request for changing the composition of the first space based on identifying a zoom-in event or a zoom-out event associated with the camera application.

In an example embodiment, in the method, transmitting the request for changing the composition of the first space to the first external electronic device based on identifying the first event associated with the camera application may comprise transmitting, to the first external electronic device, the request for changing the composition of the first space based on identifying an event associated with a change in a posture of the electronic device.

In an example embodiment, the method may further comprise changing an operating mode of the camera application into a selfie mode based on an input. The method may further comprise transmitting the request for changing the composition of the first space to the first external electronic device based on changing the operating mode of the camera application into the selfie mode. The method may further comprise displaying the composition-changed first space through the display module based on receiving data generated based on the request, from the first external electronic device. The method may further comprise displaying a first object obtained by a camera module of the electronic device on an upper layer from a layer of the composition-changed first space.

In an example embodiment, the method may further comprise inputting an image obtained by the camera module to a first object recognition model. The method may further comprise obtaining the first object as an output of the first object recognition model.

In an example embodiment, the method may further comprise changing an operating mode of the camera application to a recording mode based on an input. The method may further comprise starting recording the first space displayed on the execution screen of the camera application through the display module based on an input. The method may further comprise transmitting a request for changing a composition of the first space to the first external electronic device based on identifying a first event associated with the camera application while recording the first space. The method may further comprise displaying the composition-changed first space on the execution screen of the camera application through the display module based on receiving data generated based on the request, from the first external electronic device. The method may further comprise ending the recording based on an input and obtaining a video for the first space.

In an example embodiment, the identification information may include at least one of an ID, a password, or a subscription code.

The electronic device according to an embodiment of the disclosure may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used herein, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

An embodiment of the disclosure may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The storage medium readable by the machine may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to an embodiment of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to an embodiment, each component (e.g., a module or a program) of the above-described components may include a single entity or multiple entities. Some of the plurality of entities may be separately disposed in different components. According to an embodiment, one or more of the above-described components may be omitted, or one or more other components may be added. Alternatively or Further, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Further, the structure of the data used in embodiments of the disclosure may be recorded in a computer-readable recording medium via various means. The computer-readable recording medium includes a storage medium, such as a magnetic storage medium (e.g., a ROM, a floppy disc, or a hard disc) or an optical reading medium (e.g., a CD-ROM or a DVD).

Example embodiments of the disclosure have been described above. The above-described embodiments are merely examples, and it will be appreciated by those of ordinary skill in the art various changes may be made thereto without departing from the scope of the present disclosure. Therefore, the disclosed embodiments should be considered from an illustrative, rather than a limiting, point of view. The scope of the disclosure includes the claims. All differences within the equivalent range should be construed as being included in the present disclosure. It will also be understood that any of the embodiment(s) described herein may be used in conjunction with any other embodiment(s) described herein.

What is claimed is:

1. An electronic device comprising:
   a communication module comprising communication circuitry;
   a camera module comprising at least one camera;
   a display module comprising a display; and
   at least one processor, comprising processing circuitry, operatively connected to the communication module, the camera module, and the display module, and configured to:
   execute a camera application in a rear camera mode of the camera application;
   establish a communication connection with a first external electronic device corresponding to first identification information through the communication module based on obtaining the first identification information while the camera application is executed;
   display, through the display module, a first space on the execution screen of the camera application based on data received from the first external electronic device based on the communication connection, wherein the first space includes a first virtual reality space that corresponds to a direction the avatar, included in the first virtual reality space, is looking;
   based on identifying a first event associated with the camera application, transmit a request for changing a composition of the first space to the first external electronic device, wherein the first event include an event for changing a mode of the camera application from the rear camera mode to a selfie mode of the camera application;
   based on receiving data generated based on the request, display, through the display module, the composition-changed first space on the execution screen of the camera application from the first external electronic device while the camera application is executed in the selfie mode, wherein the composition-changed first space includes a second virtual reality space having a composition opposite to the first virtual reality space before the composition is changed, generate a mixed reality image by synthesizing a first image obtained by the camera module in the selfie mode and the second virtual reality space, and display, through the display module, the mixed reality image.

2. The electronic device of claim 1, wherein one or more of the at least one processor is configured to:

display a first window associated with an account selection through the display module based on an input;

display a second window associated with input of identification information through the display module based on an input to the first window; and establish the communication connection with the first external electronic device corresponding to the first identification information based on obtaining the first identification information based on an input to the second window.

3. The electronic device of claim 2, wherein the first window includes at least one an object corresponding to at least one account for establishing communication connection with at least one external electronic device.

4. The electronic device of claim 1, wherein one or more of the at least one processor is configured to:

display a third window (720) associated with an account setting through the display module (160) based on a user input;

display a fourth window associated with input of identification information through the display module based on an input to the third window; and display account information corresponding to second identification information on a fifth window based on obtaining the second identification information.

5. The electronic device of claim 1, wherein one or more of the at least one processor is configured to, as at least part of transmitting the request for changing the composition of the first space to the first external electronic device based on identifying the first event associated with the camera application:

transmit, to the first external electronic device, the request for changing the composition of the first space based on identifying a zoom-in event or a zoom-out event associated with the camera application.

6. The electronic device of claim 1, wherein one or more of the at least one processor is configured to, as at least part of transmitting the request for changing the composition of the first space to the first external electronic device based on identifying the first event associated with the camera application:

transmit, to the first external electronic device, the request for changing the composition of the first space based on identifying an event associated with a change in a posture of the electronic device.

7. The electronic device of claim 1, wherein one or more of the at least one processor is configured to:

display a first object, included in the first image, obtained by the camera module of the electronic device on an upper layer from a layer of the composition-changed first space.

8. The electronic device of claim 1, wherein one or more of the at least one processor is configured to:

input an image obtained by the camera module to a first object recognition model; and obtain a first object as an output of the first object recognition model, and display, through the display module, the first object.

9. The electronic device of claim 1, wherein one or more of the at least one processor is configured to:

change an operating mode of the camera application to a recording mode based on an input;

start recording the first space displayed on the execution screen of the camera application through the display module based on an input;

transmit a request for changing a composition of the first space to the first external electronic device based on identifying a first event associated with the camera application while recording the first space;

display the composition-changed first space on the execution screen of the camera application through the display module based on receiving data generated based on the request, from the first external electronic device; and end the recording based on an input and obtain a video for the first space.

10. The electronic device of claim 1, wherein the identification information includes at least one of an ID, a password, or a subscription code.

11. A method for obtaining an image related to virtual reality content by an electronic device, the method comprising:

executing a camera application in a rear camera mode of the camera application;

establishing a communication connection with a first external electronic device corresponding to first identification information through communication circuitry of a communication module of the electronic device based on obtaining first identification information while the camera application is executed;

displaying, through a display of a display module of the electronic device, a first space on the execution screen of the camera application based on data received from the first external electronic device, wherein the first space includes a first virtual reality space that corresponds to a direction the avatar, included in the first virtual reality space, is looking;

transmitting a request for changing a composition of the first space to the first external electronic device based on identifying a first event associated with the camera application, wherein the first event include an event for changing a mode of the camera application from the rear camera mode to a selfie mode of the camera application;

displaying, through the display module, the composition-changed first space on the execution screen of the camera application based on receiving data generated based on the request, from the first external electronic device while the camera application is executed in the selfie mode, wherein the composition-changed first space includes a second virtual reality space having a composition opposite to the first virtual reality space before the composition is changed;

generating a mixed reality image by synthesizing a first image obtained by the camera module in the selfie mode and the second virtual reality space, and displaying, through the display module, the mixed reality image.

12. The method of claim 11, further comprising:

displaying a first window associated with an account selection through the display module based on an input;

displaying a second window associated with input of identification information through the display module based on an input to the first window; and establishing the communication connection with the first external electronic device corresponding to the first identification information based on obtaining the first identification information based on an input to the second window.

13. The method of claim 12, wherein the first window includes at least one object corresponding to at least one account for establishing communication connection with at least one external electronic device.

14. The method of claim 11, further comprising:

displaying a third window associated with an account setting through the display module based on an input;

displaying a fourth window associated with input of identification information through the display module based on an input to the third window; and displaying account information corresponding to second identification information on a fifth window based on obtaining the second identification information.

15. The method of claim 11, wherein transmitting the request for changing the composition of the first space to the first external electronic device based on identifying the first event associated with the camera application comprises: transmitting, to the first external electronic device, the request for changing the composition of the first space based on identifying a zoom-in event or a zoom-out event associated with the camera application.

16. The method of claim 11, wherein transmitting the request for changing the composition of the first space to the first external electronic device based on identifying the first event associated with the camera application comprises: transmitting, to the first external electronic device, the request for changing the composition of the first space based on identifying an event associated with a change in a posture of the electronic device.

17. The method of claim 11, further comprising:

displaying a first object, included in the first image, obtained by a camera module of the electronic device on an upper layer from a layer of the composition-changed first space.

18. The method of claim 11, further comprising:

inputting an image obtained by the camera module to a first object recognition model; and obtaining a first object as an output of the first object recognition model, and displaying, through the display module, the first object.

19. The method of claim 11, further comprising:

changing an operating mode of the camera application to a recording mode based on an input;

starting recording the first space displayed on the execution screen of the camera application through the display module based on an input;

transmitting a request for changing a composition of the first space to the first external electronic device based on identifying a first event associated with the camera application while recording the first space;

displaying the composition-changed first space on the execution screen of the camera application through the display module based on receiving data generated based on the request, from the first external electronic device; and ending the recording based on an input and obtaining a video for the first space.

20. The method of claim 11, wherein the identification information includes at least one of an ID, a password, or a subscription code.

* * * * *